US007683942B2

(12) United States Patent
Tsujii et al.

(10) Patent No.: US 7,683,942 B2
(45) Date of Patent: Mar. 23, 2010

(54) INFORMATION RECORDING APPARATUS AND CONTROL METHOD THEREOF

(75) Inventors: Hideaki Tsujii, Tokyo (JP); Tomohiro Sekiguchi, Kawasaki (JP); Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1281 days.

(21) Appl. No.: 11/130,116

(22) Filed: May 17, 2005

(65) Prior Publication Data

US 2005/0259163 A1    Nov. 24, 2005

(30) Foreign Application Priority Data

| May 18, 2004 | (JP) | ............................. 2004-148036 |
| Jun. 11, 2004 | (JP) | ............................. 2004-174596 |
| Jun. 11, 2004 | (JP) | ............................. 2004-174597 |

(51) Int. Cl.
 *H04N 5/76* (2006.01)
 *H04N 7/26* (2006.01)
 *G06F 13/00* (2006.01)

(52) U.S. Cl. .............. 348/231.2; 348/231.3; 348/231.7; 386/124; 711/162

(58) Field of Classification Search .............. 348/231.2, 348/231.3, 231.7; 386/124; 711/162; 714/6
See application file for complete search history.

(56) References Cited

U.S. PATENT DOCUMENTS

| 5,164,831 | A | * | 11/1992 | Kuchta et al. ............. 348/231.7 |
| 5,440,401 | A | * | 8/1995 | Parulski et al. .............. 386/124 |
| 5,689,303 | A | * | 11/1997 | Kuroiwa ................... 348/231.3 |
| 6,430,653 | B1 | | 8/2002 | Fujikawa .................... 711/113 |
| 6,538,692 | B2 | | 3/2003 | Niwa ........................ 348/231.1 |
| 6,615,365 | B1 | * | 9/2003 | Jenevein et al. ................ 714/6 |
| 6,728,476 | B1 | * | 4/2004 | Haseno ........................ 386/125 |
| 2004/0036780 | A1 | | 2/2004 | Toba ....................... 348/231.2 |
| 2004/0088367 | A1 | * | 5/2004 | Reinke ........................ 709/215 |

FOREIGN PATENT DOCUMENTS

| JP | 8-063901 | 3/1996 |
| JP | 8-153376 | 6/1996 |
| JP | 10-172237 | 6/1998 |
| JP | 11-112937 | 4/1999 |
| JP | 11-316709 | 11/1999 |
| JP | 2002-091814 | 3/2002 |
| JP | 2004-080461 | 3/2004 |

OTHER PUBLICATIONS

Japanese Office Action dated Jan. 6, 2009 in corresponding Japanese Application No. 2004-148036.

* cited by examiner

*Primary Examiner*—Nhan T Tran
(74) *Attorney, Agent, or Firm*—Fitzpatrick, Cella, Harper & Scinto

(57) ABSTRACT

Controlling an information recording apparatus for recording information in a detachable, re-writable storage medium which has a storage size exceeding a maximum allowable size of a first file system. When externally input information is stored in a single storage medium having a first storage area initialized by the first file system, and a second storage area initialized by a second file system which can access an area that exceeds the maximum allowable size of the first file system, the externally input information is stored in the second area, and information derived from the externally input information is stored in the first area. Link information between the information stored in the second area and the derivative information stored in the first area is recorded in the second area as management information.

6 Claims, 27 Drawing Sheets

FIG. 8

| PARTITION A | PARTITION B |
|---|---|
| A / DCIM / 001_AAAA / IMG_0001 | B / DCIM / 001_BBBB / IMG_0011 |
| A / DCIM / 001_AAAA / IMG_0002 | B / DCIM / 001_BBBB / IMG_0012 |
| A / DCIM / 001_AAAA / IMG_0003 | B / DCIM / 001_BBBB / IMG_0013 |
| A / DCIM / 001_AAAA / IMG_0004 | B / DCIM / 001_BBBB / IMG_0014 |
| A / DCIM / 001_AAAA / IMG_0005 | B / DCIM / 001_BBBB / IMG_0015 |
| A / DCIM / 001_AAAA / IMG_0006 | B / DCIM / 001_BBBB / IMG_0016 |

FIG. 19

MOVING IMAGE RELATED IMAGE LIST

1. C:¥DCIM¥103CANON¥MVI_0301.AVI
2. D:¥DCIM¥103CANON¥MVI_0302.AVI

| AUTO RECORDING MODE FLAG | ~2111 |
|---|---|
| NUMBER OF PARTITIONS | |
| A | C |
| B | B |
| C | A |
| — | — |

MOVING IMAGE RECORDING ORDER — STILL IMAGE RECORDING ORDER

INFORMATION RECORDING APPARATUS AND CONTROL METHOD THEREOF

FIELD OF THE INVENTION

The present invention relates to a technique for recording information on a detachable storage medium such as a memory card and the like.

BACKGROUND OF THE INVENTION

Digital information apparatuses in recent years, especially, recording/playback apparatuses such as digital still cameras, digital video cameras, and the like, which record images and audio information, require large-capacity storage media in terms of the characteristics of information to be handled. In digital still cameras, the number of image sensing pixels increases dramatically year by year, and the recording data size is still on the rise. In the field of video cameras, the recording data size is increasing upon transition from the SD format to the HD format.

Upon an increase in the data size to be handled, large-capacity recording media (memory cards) are in high demand, and the capacity of the recording medium itself is expected to maintain the increasing trend. Under the circumstances, media which have a capacity beyond the maximum recording capacity assumed in the conventional area format the recording area format of recording media have been developed, and media must be initialized by a new area format.

For example, a CF card used in digital cameras and the like is generally formatted by a file system called FAT (File Allocation Tables) 16 (or simply FAT). In the specification of the FAT16 file system, the maximum size per cluster is specified by 32 KB. Since such clusters are accessed by 16-bit addresses, 32 KB$\times 2^{16}$=2 GB (gigabytes), and a memory space up to 2 GB in maximum can be accessed. In other words, an area beyond 2 GB cannot be accessed.

However, the memory card vendors have released 4 GB micro drives. Since the conventional FAT16 does not support such large-capacity storage media, a further extended file system, e.g., FAT32, must be used.

The trouble is that conventional digital devices that assume to handle storage media formatted by the FAT16 file system (most of not only existing digital cameras but also conventional photo-direct printers which print by mounting storage media) can digitally connect storage media but cannot access files stored in the FAT32 file system.

Under the circumstance, two different file systems, i.e., FAT16 and FAT32, may be used together. As a technique that allows multiple recording in two, old and new file formats on a single storage medium, for example, Japanese Patent Laid-Open No. 8-63901 (to be referred to as reference 1) and Japanese Patent Laid-Open No. 8-153376 (to be referred to as reference 2) are known.

Reference 1 mainly aims at recording high-quality data while maintaining the compatibility of the CD-DA format in consideration of the software market. That is, this technique records audio data (sampling frequency=44.1 kHz and quantization bit rate=16 bits) concentrically from the inner to the outer periphery of a disk, and records high-quality data with a higher bit rate or sampling rate on the remaining area.

In case of rewritable recording media for digital information devices such as digital still cameras and the like, data may be changed as needed. For this reason, when data are multiplexed and recorded on a plurality of recording areas, the data relationship may become inconsistent unless link information for respective recording data is available.

For example, if unnecessary data exist, and data in only one area is erased, unnecessary data remains in the other recording area. Since the multiplexed data are mutually related, if one data is erased, the other data is preferably erased except for a special case such as backup or the like.

However, since reference 1 above does not define association of data recorded on respective recording areas, it is difficult to rewrite data as needed once recording is complete for the aforementioned reason.

An "image handling apparatus" proposed by reference 2 does not consider any image recording control when a single recording medium includes a plurality of formats. For this reason, if a plurality of formats exist in a single recording medium, the user must select which format is to be used, resulting in troublesome operations.

When the free capacity of the currently used format becomes small, a required number of photos cannot be recorded in a continuous shot mode or moving image recording is interrupted although a sufficient free capacity still remains in the recording medium.

In general, a removable medium stores information for respective clusters. One cluster is a group of a plurality of sectors. The cluster size changes depending on the file system and media size. Since a cluster is a minimum unit required to handle a file, even data smaller than one cluster size uses one cluster area if it is stored as a file. For this reason, when the number of files stored in one removable medium increases, the total size of wasteful areas increases, and the full storage size of the removable medium cannot be effectively used. In other words, if one cluster size is small, the size which is consumed wastefully becomes small, and the recordable size can be increased.

On the other hand, in case of a series of large data such as a moving image, since the number of clusters that form a file decreases with increasing cluster size if the file sizes remain the same, the access count to clusters decreases, and the access speed can be increased. For these reasons, the data size (or cluster size) and access speed have a tradeoff relationship each other.

A method that allows the user to change an optimal format of a removable medium to increase the access speed of the medium is known (e.g., Japanese Patent Laid-Open No. 11-112937). Furthermore, a method that allows the user to select whether an importance is attached to the size or access speed upon initializing the format of a removable medium is known (e.g., Japanese Patent Laid-Open No. 2004-80461).

However, when a removable medium is used in an image sensing apparatus such as a digital camera, digital video camera, or the like, the first formatting determines the subsequent properties, and the properties of images to be recorded cannot be adaptively supported under existing circumstances.

SUMMARY OF THE INVENTION

The present invention has been made in consideration of the aforementioned problems, and has as its first object to provide a technique that allows a detachable, rewritable storage medium to roughly maintain downward compatibility while the storage medium has two different partition areas for a conventional accessible file system and an extended file system.

It is the second object of the present invention to continuously record a plurality of related images on a recording medium without making the user recognize a change in format.

It is the third object of the present invention to provide a technique which allows efficient use of a memory area of a storage medium by allowing a storage medium to store data to include a plurality of partition areas, and by determining an optimal storage destination partition area depending on whether an image to be recorded is a still image or moving image.

In order to achieve the first object, an information recording apparatus of the present invention comprises the following arrangement. That is, there is provided an information recording apparatus for recording information in a detachable, rewritable storage medium which has a storage size exceeding a maximum allowable size of a first file system, comprising:

first information recording means for, when externally input information is stored in a single storage medium having a first storage area initialized by the first file system, and a second storage area initialized by a second file system which can access an area that exceeds the maximum allowable size of the first file system, storing the externally input information in the second area, and information derived from the externally input information in the first area; and management information recording means for recording link information between the information stored in the second area and the derivative information stored in the first area, in the second area as management information.

In order to achieve the second object, a recording apparatus of the present invention comprises the following arrangement. That is, there is provided a recording apparatus for recording a plurality of related images in a detachable recording medium, comprising:

data recording means for identifying types of formats that exist in the recording medium, and recording image data in the recording medium in correspondence with the identified formats; and naming means for naming file names of image data to be recorded in the recording medium by the data recording means as consecutive file names, wherein when a plurality of related images are recorded in the recording medium, and a remaining recordable size of an image format in which image recording is in progress is smaller than a predetermined size, the data recording means records remaining images of the plurality of related images in another image format different from the image format in which image recording is in progress, and the naming means names consecutive file names in association with the plurality of related images recorded using the plurality of image formats.

In order to achieve the third object, an image recording apparatus of the present invention comprises the following arrangement. That is, there is provided an image recording apparatus for recording a still image and moving image as files in a detachable, randomly accessible storage medium, comprising:

detection means for identifying a plurality of partition areas assured on an attached storage medium, and detecting cluster sizes as data storage units of the partition areas;

still image storage means for, when a still image is saved as a file in the storage medium, preferentially storing the still image in an order from the partition area with a smaller cluster size; and moving image storage control means for, when a moving image is saved as a file in the storage medium, preferentially storing the moving image in an order from the partition area with a larger cluster size.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 shows the data format of management information according to the first embodiment;

FIG. 19 shows an example of a moving image related image list;

FIG. 23 shows an example of the storage contents of an information storage unit according to the fourth embodiment;

DETAILED DESCRIPTION OF THE PREFERRED EMBODIMENTS

Preferred embodiments of the present invention will be described in detail hereinafter with reference to the accompanying drawings.

First Embodiment

The first embodiment will exemplify a case wherein the present invention is applied to a digital camera as an information recording/playback apparatus, and to a memory card as a detachable, rewritable storage medium.

Figure 1:
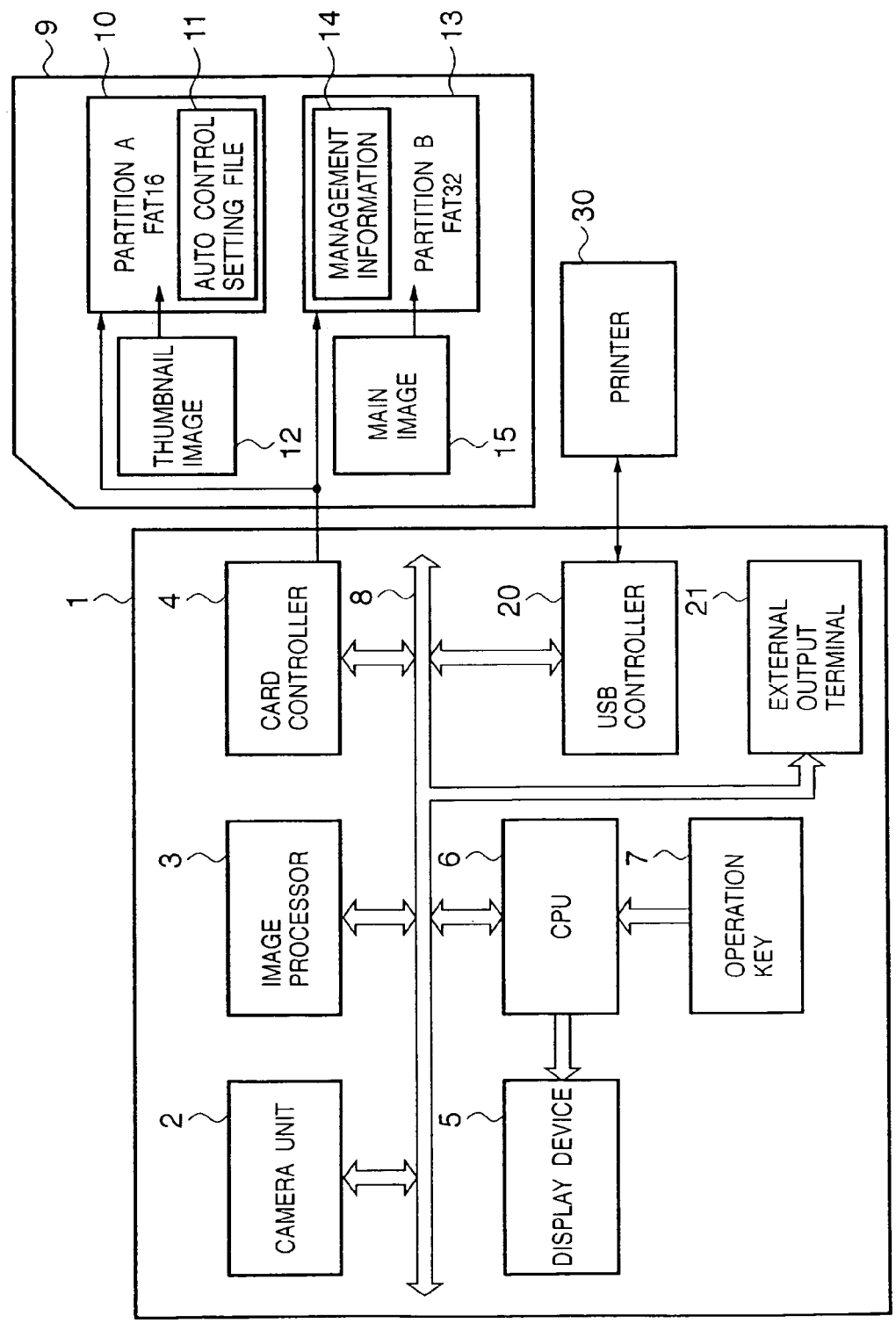
FIG. 1 is a block diagram of a digital still camera according to the first embodiment.

FIG. 1 is a block diagram showing the digital camera in this embodiment. This digital camera can access not only FAT16 but also the FAT32 file system.

A digital camera main body 1 comprises a camera unit 2 for image sensing, an image processor 3 for converting a signal sensed by the camera into predetermined digital data, a card controller 4 serving as an interface with a memory card 9 as a recording medium, operation keys 7 as an input unit operated by the user, a display device 5 for displaying the operation state and images for the user, and a CPU 6 for controlling the system. The control of the CPU and exchange of internal data are made via a system bus 8. A USB controller 20 can connect devices such as a USB printer, PC, and the like having USB interfaces. An external output terminal 21 includes an NTSC composite video output terminal, and a D terminal that connects a high-resolution display device such as an HDTV or the like, and has sensors for detecting connection of cables to these terminals.

On the memory card 9, two file systems, i.e., a partition A 10, the area of which is initialized by FAT16 that can be accessed by conventional devices, and a partition B 13, the area of which is initialized by FAT32 as an extended file system, are built. Note that the setting of the partitions can be made by the digital camera of this embodiment.

In the digital camera of this embodiment, image data sensed by the camera unit 2 is compression-encoded by the image processor 3, and is then stored in the partition B 13 as a main image data file. On the other hand, a thumbnail image 12 is generated using the main image as an input source upon image sensing or at a predetermined timing (to be described later), and is recorded in the partition A. The partition A includes an auto control setting file storage folder 11 that stores auto control setting files such as an auto play setting file, auto print setting file, and the like.

As an example of the auto control setting files, DPOF (Digital Print Order Format) is prevalent. Also, information indicating association between thumbnail image data stored in the partition A and main image data files recorded in the partition B is recorded in the partition B as a management information file 14.

Figure 2:
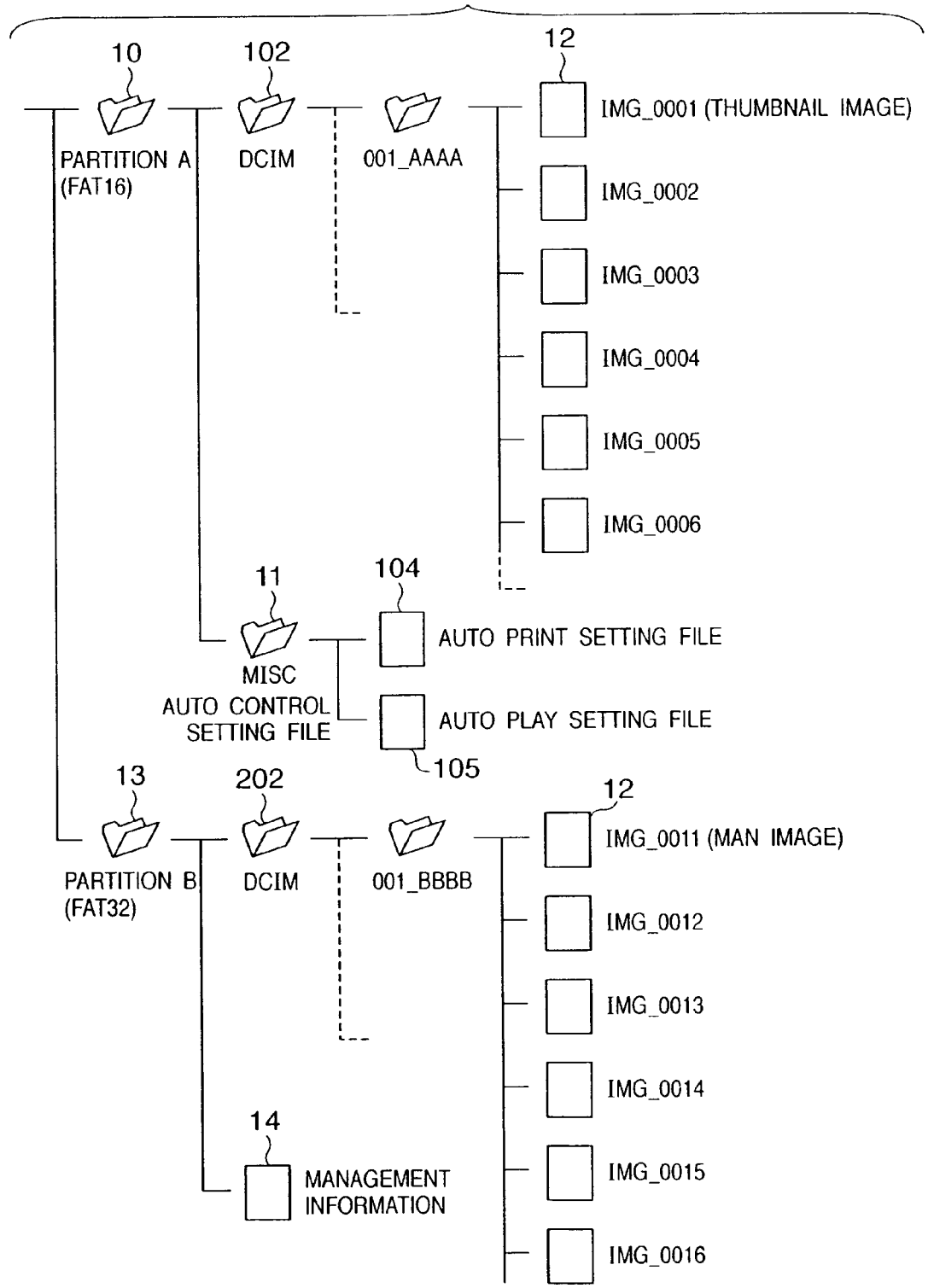
FIG. 2 shows the file systems and data tree structure of a memory card according to the first embodiment.

FIG. 2 shows the directory tree structure recorded in the memory card 9 of this embodiment.

The area of the partition A 10 is assured and initialized as the first partition by the FAT16 file system, and that of the partition B 13 is assured and initialized as the second partition by the FAT32 file system. In order to allow the conventional devices (the conventional digital cameras, direct-photo printers, and the like) that can access FAT16 alone to access the partition A, the partition A must be assigned to the first partition (upper addresses) at the head of the memory card.

The respective partitions include folders (102 and 202) used to save images. It is a common practice to record such files according to the DCF (Design rule for Camera File system) format in the digital camera.

In the contents of the management information file 14, a path to a thumbnail image recorded in the partition A is defined in one-to-one correspondence to one main image recorded in the partition B, as shown in FIG. 8, thus setting the specification that allows to easily retrieve a main image from a thumbnail image and vice versa. However, the conventional device that supports FAT16 alone as the file system cannot access the partition B.

The auto control setting files 11 are simultaneously managed in the partition A. The auto control setting file storage folder can save an auto print setting file 104, an auto play setting file for a slide show, and the like.

Figure 3:
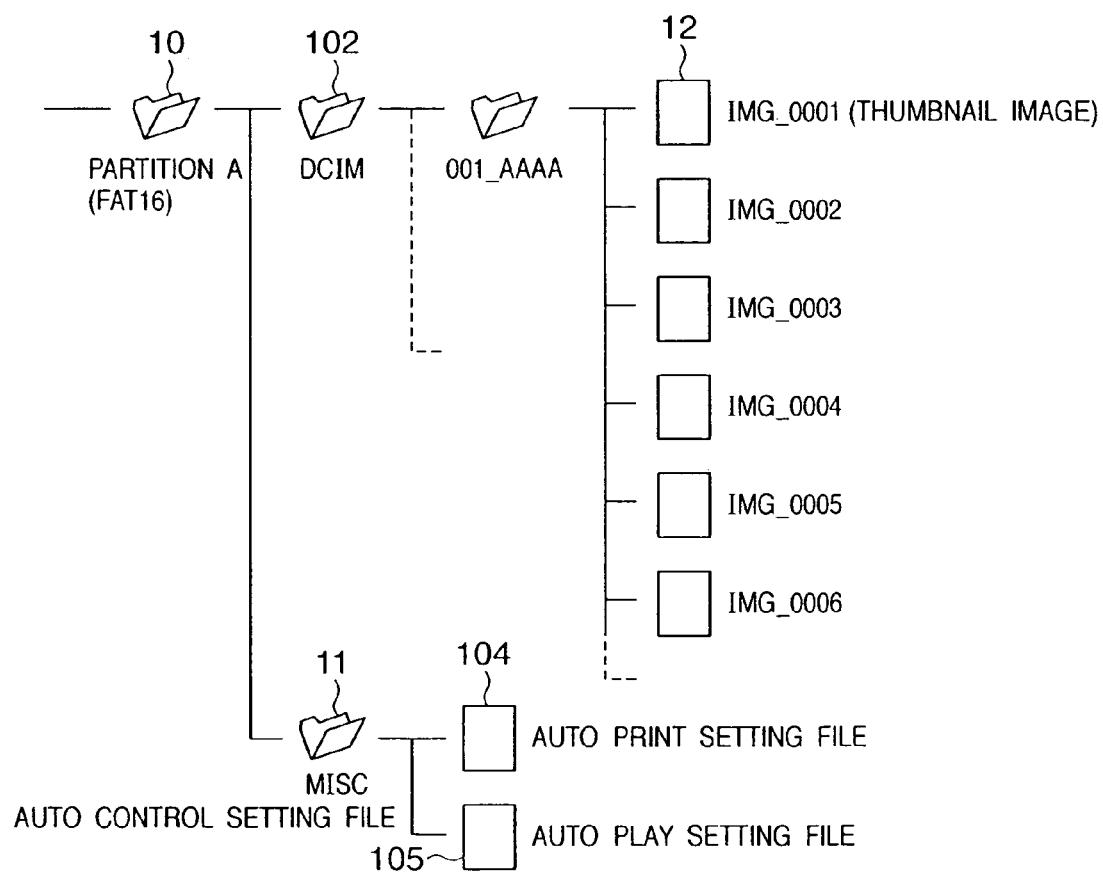
FIG. 3 shows the data tree structure recognized when a recording medium of the first embodiment is attached to a conventional device.

When the memory card with the aforementioned configuration is attached to the conventional device, the partition B cannot be accessed, but the partition A is definitely the conventional format, and the conventional device can play back thumbnail images sensed by the information recording/playback apparatus of this embodiment. In this case, the conventional device can access information in the memory card as the tree structure shown in FIG. 3. Compared to FIG. 2, the conventional device cannot see the partition B.

<Consistency Process>

As described above, the digital still camera of this embodiment assures two partition areas of FAT16 and FAT32 on the memory card 9, and stores main images in the FAT32 area, and thumbnail images in the FAT16 area. As a result, when the memory card 9 is attached to the conventional digital device (conventional digital camera or the like) that supports on FAT16 alone, that device can browse (display) at least thumbnail images.

When the memory card 9 is attached to the conventional digital still camera to sense a new image, both that main image and its thumbnail image are obviously stored in the FAT16 area. When this memory card 9 is attached to the digital camera of this embodiment again, no special problem is posed.

However, a problem is posed in the following case. That is, when the memory card 9 which stores images sensed by the digital still camera of this embodiment is attached to the conventional device, and a desired image is erased, the erased image is a thumbnail image, and the corresponding main image remains stored in the FAT32 partition.

In this embodiment, when the thumbnail image corresponding to the main image stored in the FAT32 area is not stored in the FAT16 area in the management information assured in the FAT32 partition, their consistency is maintained.

Figure 6:
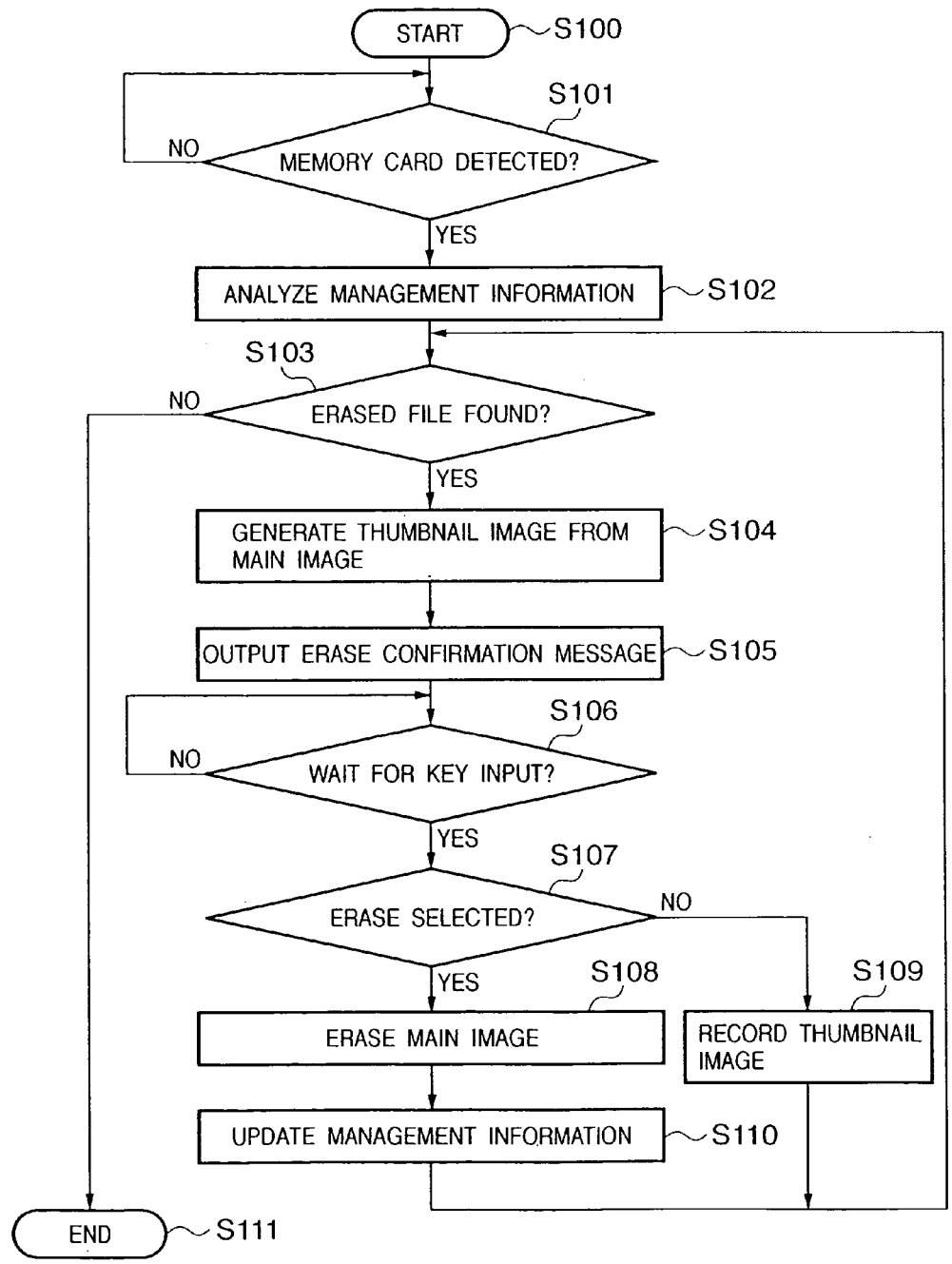
FIG. 6 is a flowchart showing the processing sequence upon activating the digital still camera and upon attaching the memory card according to the first embodiment.

This process will be described below with reference to the flowchart of FIG. 6. Note that this process is executed when the memory card is attached or when the power switch is turned on.

If the memory card is detected in step S101, the management information assured in the FAT32 area is analyzed in step S102. That is, main images which are stored in the partition B (FAT32) and have no corresponding thumbnail images are searched, and if such case is found, a main image file name list is temporarily stored in the internal RAM of the CPU 6.

It is checked in step S103 if all thumbnail images corresponding to all main images stored in the partition B (FAT32) are stored in the partition A.

If it is determined that all the thumbnail images are stored, since they are consistent, this process ends.

Figure 7:
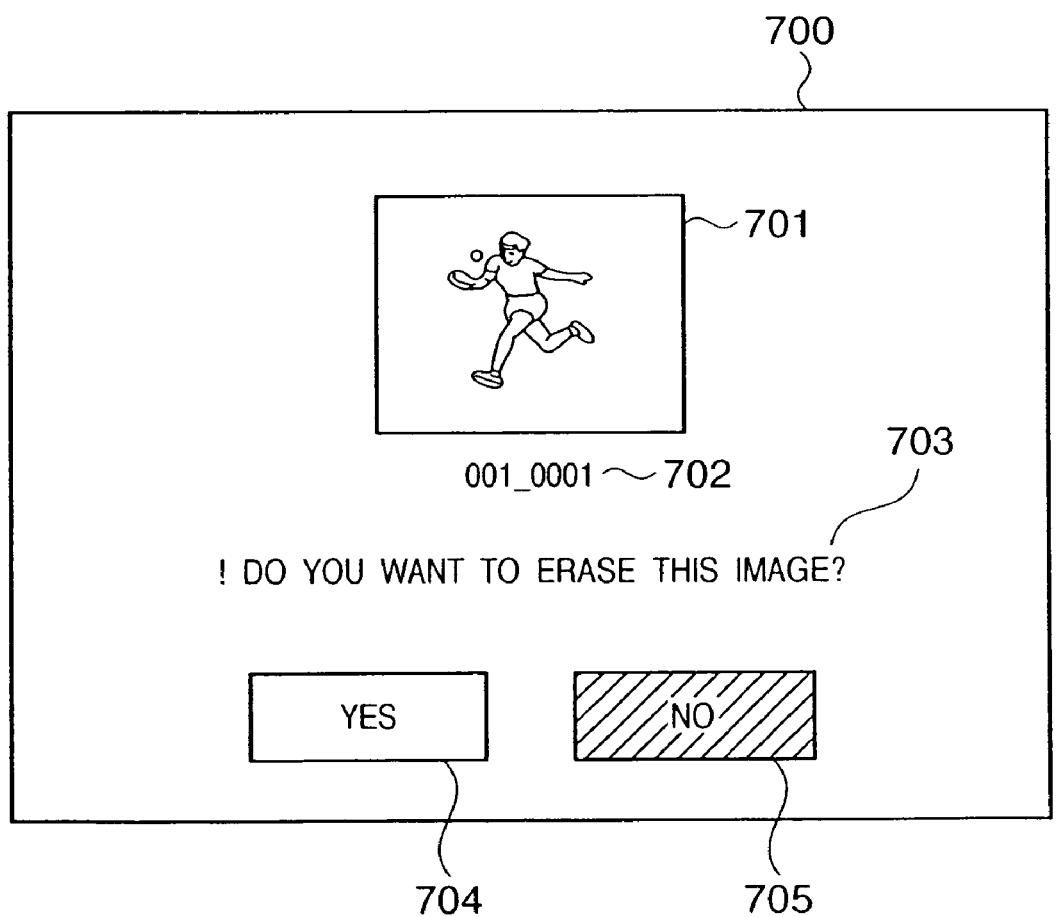
FIG. 7 shows a display example in a consistency process according to the first embodiment.

On the other hand, if a list is created, one of the main images is selected as an image of interest, and a thumbnail image of that main image is temporarily generated on the RAM in step S104. Then, the generated thumbnail image is displayed on the display device 5, and the control asks the user whether or not the corresponding main image is to be erased. In step S106, the control waits for a user's input. FIG. 7 shows the display example at this time. The user selects either "YES" or "NO" by operating cursor keys, and then presses an enter key using the operation keys 7.

It is checked in step S107 if the user selects to erase the image. If the user selects to erase the image, the flow advances to step S108 to erase the main image of interest from the FAT32 partition B, and the image file name of interest is also deleted from the management information 14 in step S110.

On the other hand, if the user selects not to erase the image, the flow advances to step S109, and the thumbnail image created on the RAM is stored in the FAT16 partition A.

After that, the flow returns to step S103, and the same processes are repeated for the main images which are stored in the partition B but have no thumbnail images.

As described above, when the power switch of the digital still camera of this embodiment is turned on or when the memory card is attached, the aforementioned consistency process is executed so as to maintain consistency at least between main images stored in the partition B and thumbnail images stored in the partition A.

In the digital still camera of this embodiment, upon deleting an image, three data, i.e., a main image, thumbnail image, and a corresponding item in the management information are erased.

<Generation of Auto Play Setting File>

An auto play setting file generation process of this embodiment will be described below.

"Auto play" is to automatically execute a display process of desired images stored in the memory card 9 in a desired order in accordance with setting contents, i.e., by setting a required time for each individual image. Generation of this auto play setting file is not limited to the digital still camera of this embodiment, and may be applied to the conventional device if it has such function.

Figure 4:
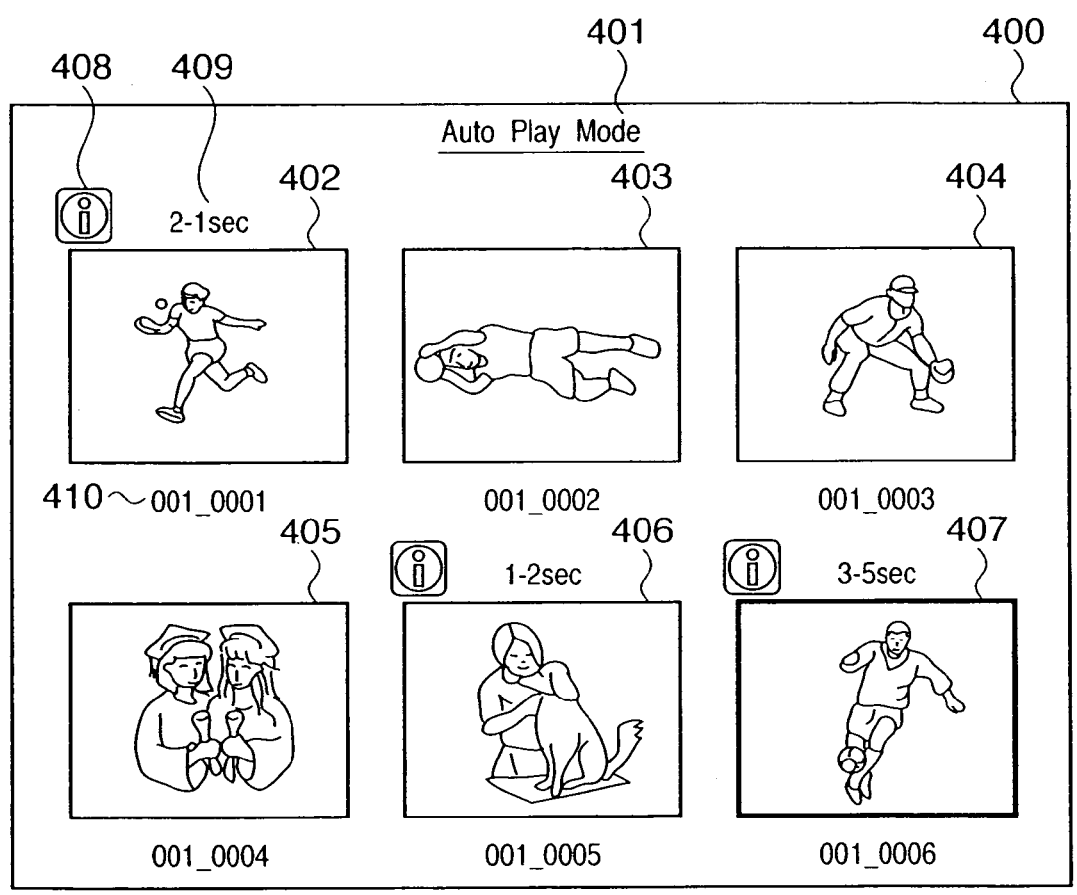
FIG. 4 shows a display example during generation of an auto play setting file according to the first embodiment.

FIG. 4 shows a display example on the display device 5 during generation of the auto play setting file (a bold frame indicates a state selected by the cursor keys). In case of FIG. 4, six images are displayed. By operating the operation keys, images can be switched every six images. Also, the display images shown in FIG. 4 are obtained by further reducing thumbnail images.

When the user makes key operations, the control can enter an auto play setting file generation mode. An operation window 400 displays an operation mode 401, images (402 to 407), and additional information of each mage (an image file name 410, auto play mark 408, and play sequence 409). For example, this window shows that an image 402 is stored in a 001XXXXX directory, has a file name XXXX0001 (X is one of English letters A to Z), and is set to have the 2nd play order and play time for 1 sec.

Figure 9:
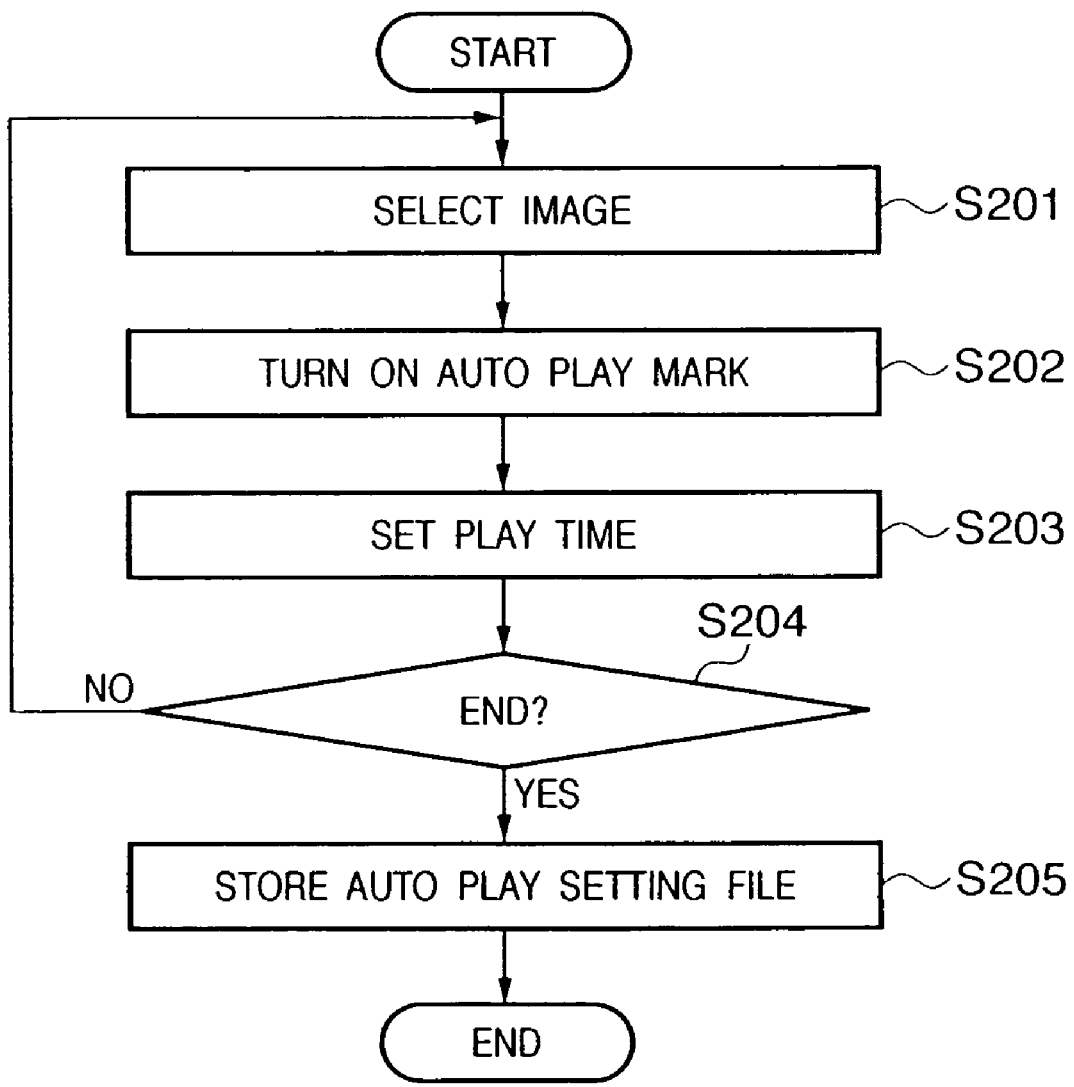
FIG. 9 is a flowchart showing the generation processing sequence of an auto play setting file according to the first embodiment.

FIG. 9 is a flowchart of the processing of the CPU 6 upon depression of an auto play setting start instruction key in the operation keys 7. The following explanation will be given with reference to FIG. 7.

In step S201, the user selects an image to be automatically played back first using the cursor keys included in the operation keys 7, and determines that image by pressing the enter key. In the example of FIG. 4, since images are displayed in increments of six images, if the cursor key is pressed in a direction to surpass them, next or previous six images are displayed. Images to be displayed are obtained by further reducing thumbnail images in the partition A.

After the selected image is determined, the flow advances to step S202, and the auto play mark 408 is displayed in the vicinity of the selected image so as to specify that the corresponding image is selected as an object to be automatically played back. In step S203, a play time of the selected image is set in increments of sec. A default play time is 1 sec, and the play time can be incremented/decremented in increments of sec by operating the up or down cursor key. However, the minimum time is 1 sec, and a time less than 1 sec cannot be selected. When a target play time is set, the user presses the enter key to determine that time. A message that inquires as to whether image selection is to be continued or to end is displayed, and the user's choice is checked in step S204.

If an instruction indicating that image selection is to be continued is selected, the flow returns to step S201 to determine images to be played back in the second and subsequent orders and their display times in turn.

If an instruction indicating that image selection is to end is selected in step S204, the flow advances to step S205 to store the play setting contents set in the aforementioned process in the partition A as the auto play setting file 11 (see FIG. 1).

<Auto Play Process>

Figure 11:
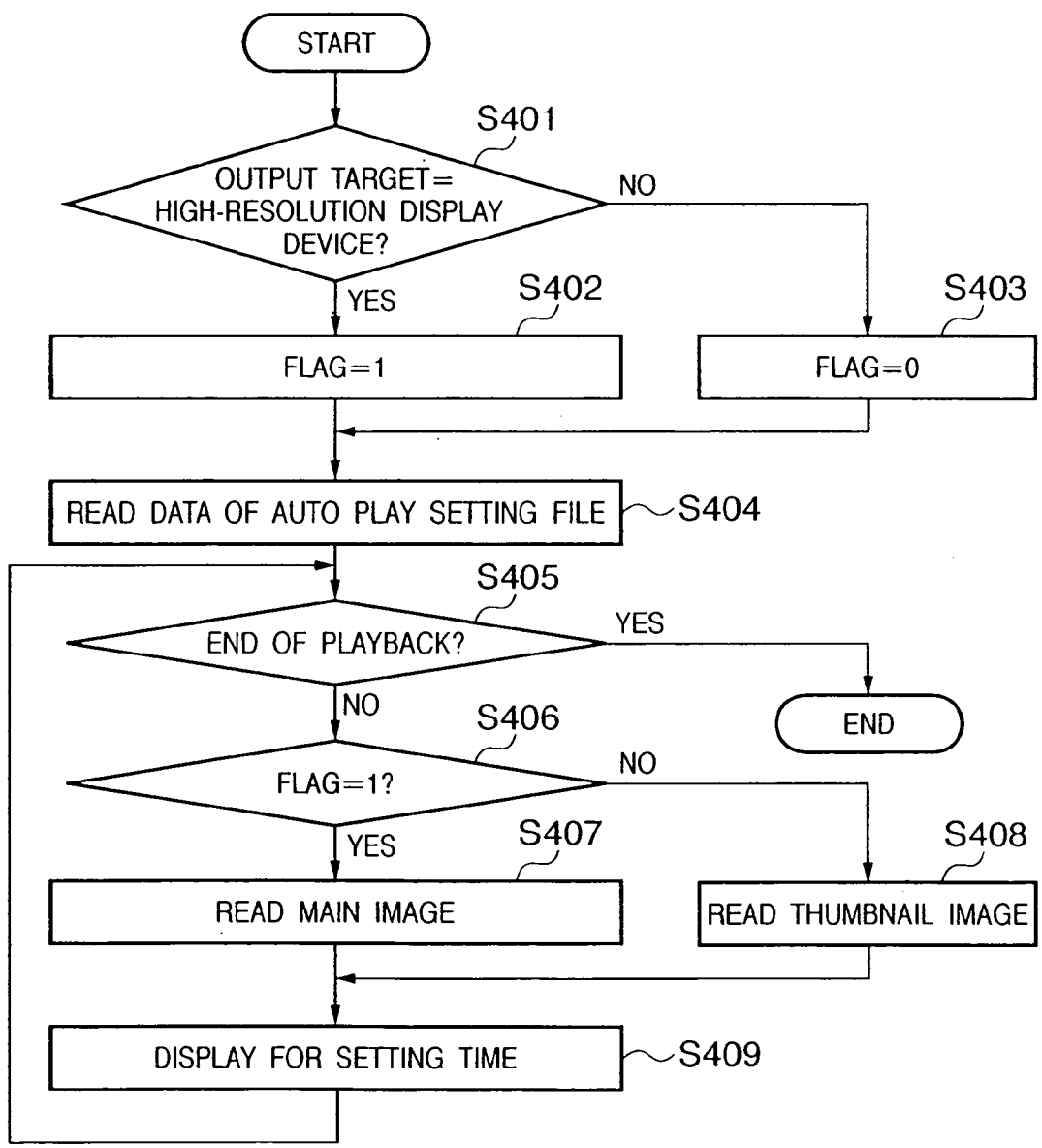
FIG. 11 is a flowchart showing the auto play processing sequence according to the first embodiment.

FIG. 11 is a flowchart showing the process upon issuing an auto play start instruction by operating the operation keys.

When no external display device is connected to the external output terminal 21, the playback output target is the display device (liquid crystal display device) 5. When an external display device is connected to the external output terminal 21 and is a normal television display device, a video signal having the same resolution as that of the display device 5 of this embodiment is output; when a high-resolution display device such as an HDTV device or the like is connected, a high-resolution image is displayed.

It is checked in step S401 if an output target device is a high-resolution display device. This checking process is attained based on a signal from the sensor provided to the external output terminal 21.

If the high-resolution display device is connected, a flag FLAG is set to be "1" in step S402. On the other hand, if the connected display device is a low-resolution display device such as a normal NTSC display device or the like, or no external display device is connected, the flag FLAG is set to be "0" in step S403.

The flow advances to step S404 to load data of the auto play setting file stored in the partition A. This file stores file names with paths of one or more images and their play time information in the play order.

It is checked in step S405 if images to be played back still remain, i.e., if playback is complete. If it is determined that images to be played back still remain, the flow advances to step S406 to check if the flag-FLAG is "1", i.e., the output target device is a high-resolution display device.

If the high-resolution display device is connected, the flow advances to step S407. Since the path of each file name described in the auto play setting file indicates a thumbnail image file in the partition A, corresponding main image data is searched for. Both the partitions A and B must be searched. The reason why the partition A must be searched is as follows. That is, after the two partitions of FAT16 and FAT32 are assured on the memory card 9 by the digital still camera of this embodiment or another device, when that memory card is attached to the conventional digital still camera to sense an image, a main image is stored in the partition A. This search process is the same as the conventional one.

Upon searching the partition B, a main image file in the partition B is specified with reference to the management information 14.

After the main image is specified, if that image is encoded (it is not RAW data), a decoding process is executed. Note that the number of image sensing pixels of current digital still cameras is as large as six to seven millions or 10 millions in some cases, and even the HDTV cannot often display the entire image as it is. In this case, a decimation process is made to adjust the image to the resolution of the HDTV.

If it is determined in step S406 that the display output target device is the simple display device 5 in this embodiment or a normal television device, since a thumbnail image suffices, the flow advances to step S408 to load the thumbnail image.

After the process in either of step S407 or S408, the flow advances to step S409, and a process for displaying the image of interest for a setting time is executed. The aforementioned processes are repeated as long as images to be played back remain.

When the memory card 9, which stores the auto play setting file generated by the digital still camera of this embodiment, is set in the digital still camera, and the auto play process is made, although images to be played back unconditionally become thumbnail images, old and new digital still cameras can use the auto play setting file.

<Auto Print Setting>

An auto print setting file generation process of this embodiment will be described below.

Figure 5:
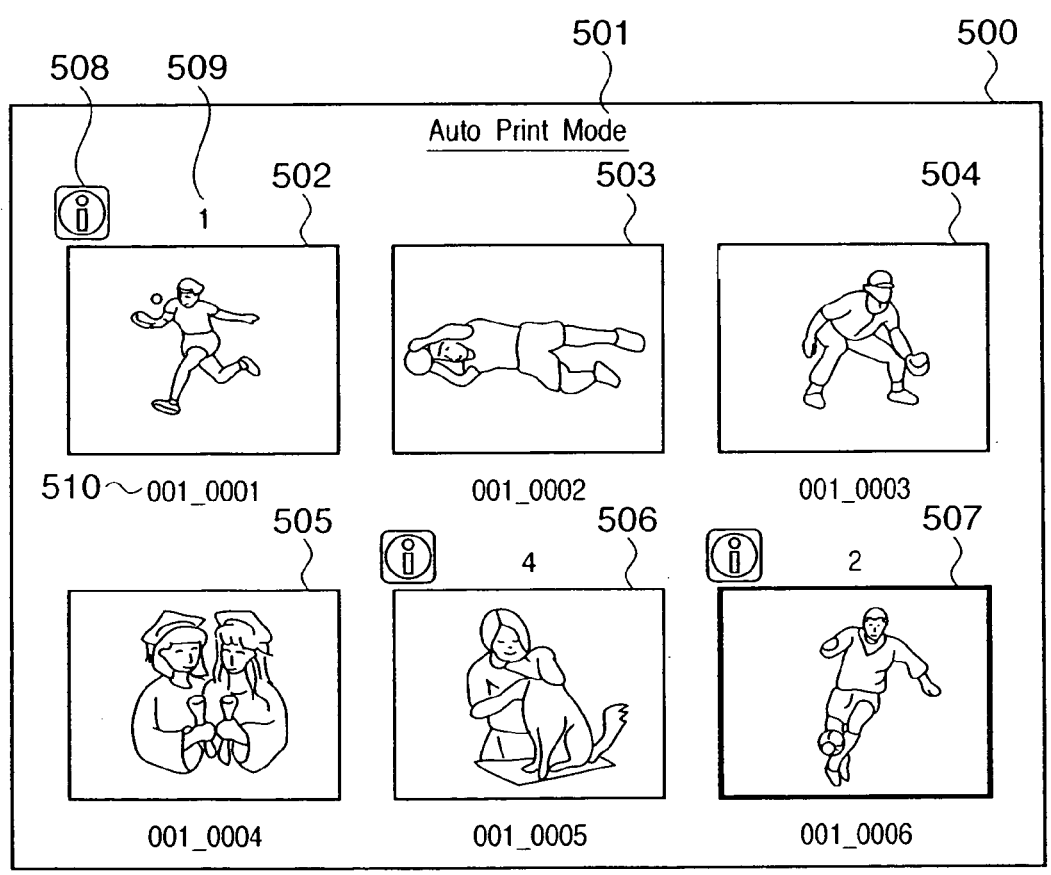
FIG. 5 shows a display example during generation of an auto print setting file according to the first embodiment.
Figure 10:
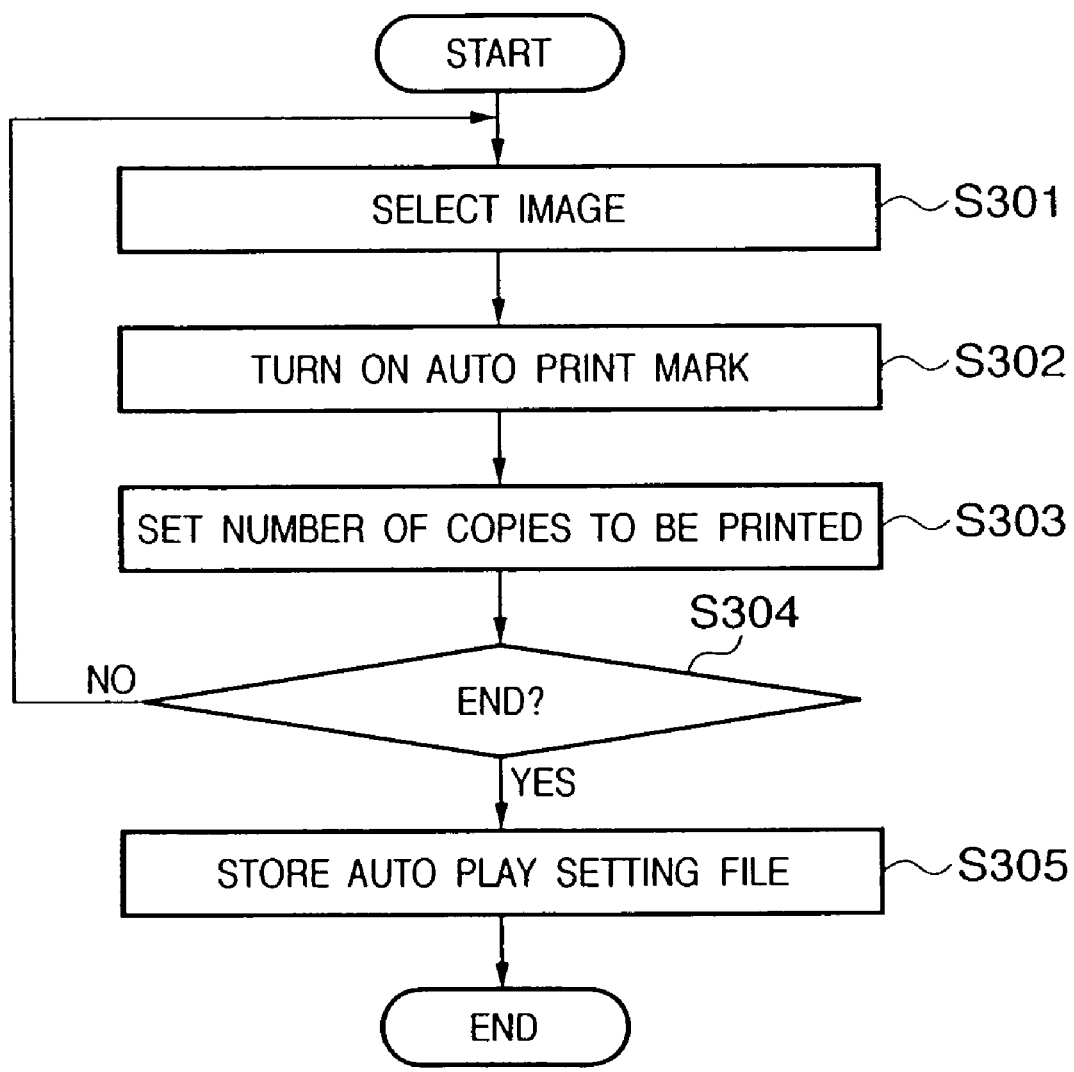
FIG. 10 is flowchart showing the generation processing sequence of an auto print setting file according to the first embodiment.

FIG. 5 shows a display example of the display device 5 during generation of an auto print setting file, and FIG. 10 is a flowchart showing its processing sequence. The following explanation will be given using these figures. Note that this process is executed when an auto print setting file generation mode instruction key included in the operation keys 7 is input.

In step S301, the user selects an image to be printed using the cursor keys included in the operation keys 7, and settles that image by pressing the enter key. In the example of FIG. 5, since images are displayed in increments of six images, if the cursor key is pressed in a direction to surpass them, next or previous six images are displayed. Images to be displayed are obtained by further reducing thumbnail images in the partition A.

After the selected image is determined, the flow advances to step S302, and an auto print mark 508 is displayed in the vicinity of the selected image so as to specify that the corresponding image is selected as an object to be automatically printed. In step S303, the number of copies to be printed of the selected image is set. The default number of copies to be printed is one, and can be incremented/decremented by operating the up and down cursor keys. The number of copies to be printed is one in minimum. The number of copies is displayed as a numerical value (509 in FIG. 5) in the vicinity of the corresponding image. The target number of copies to be printed is displayed, and is determined by operating the enter key. After that, a message that inquires as to whether image selection is to be continued or to end is displayed, and the user's choice is checked in step S304.

If an instruction indicating that image selection is to be continued is selected, the flow returns to step S301 to determine the next image to be printed and its number of copies to be printed in turn.

If an instruction indicating that image selection is to end is selected in step S304, the flow advances to step S305 to store the print setting contents set in the aforementioned process (information that specifies images to be printed and their numbers of copies) in the partition A as the auto print setting file 11 (see FIG. 1).

Figure 12:
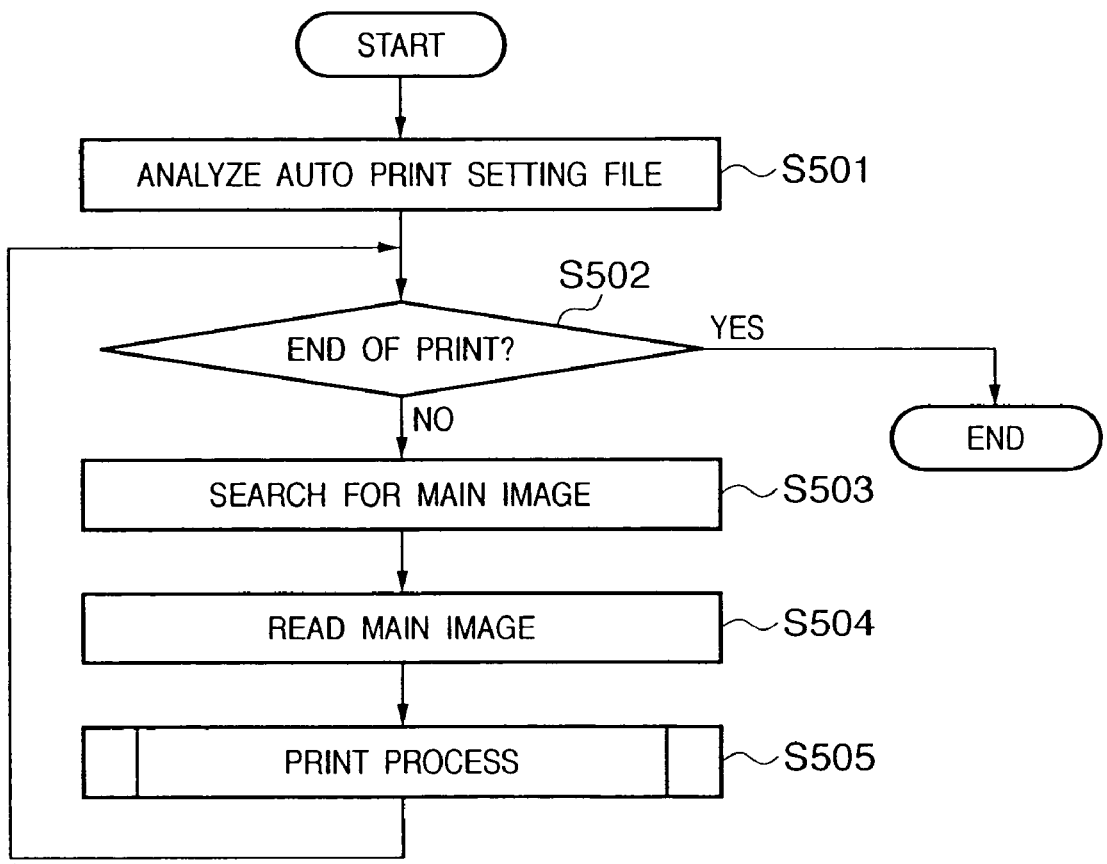
FIG. 12 is a flowchart showing the auto print processing sequence according to the first embodiment.

The auto print process in this embodiment will be described below with reference to the flowchart of FIG. 12. This process is executed when a printer 30 is connected to the USB controller 20 and an auto print instruction is input using the operation keys.

In step S501, the auto print setting file is loaded and analyzed.

It is checked in step S502 if images to be printed still remain. If all images designated by the auto print setting file have been printed, this process ends.

On the other hand, if it is determined that images to be printed still remain, the flow advances to step S503, and the location of the main image file of interest is searched for using the described image file name with the path. Both the partitions A and B must be searched. The reason why the partition A must be searched is as follows. That is, after the two partitions of FAT16 and FAT32 are assured on the memory card 9 by the digital still camera of this embodiment or another device, when that memory card is attached to the conventional digital still camera to sense an image, a main image is stored in the partition A. This search process is the same as the conventional one.

If the location of the main image is detected, that main image is loaded in step S504. In step S505, a print output process is done in correspondence with the set number of copies. After that, the flow returns to step S502, and the aforementioned processes are repeated as long as images to be printed remain.

The auto print process in this embodiment has been explained. When the memory card, which stores the auto print setting file generated by the digital still camera of this embodiment, is set in the conventional digital still camera, and an auto print process is executed, since main images stored in the partition B cannot be accessed, thumbnail images are to be printed.

As described above, according to the present invention, an operation environment with a device that accesses only the conventional file system can be maintained to some extent while using the memory card (storage medium) having the two partition areas, i.e., the conventional FAT16 file system and the FAT32 file system.

In this embodiment, the digital still camera has been explained. However, when attention is focused on the print process, the present invention may be applied to a printer apparatus which mounts a memory card upon printing. A conventional printer apparatus of this type supports the FAT16 file system. However, when a printer apparatus, which mounts a memory card having the partition areas of the two file systems and can recognize these two file systems, prints according to the auto print setting file, the same process as in FIG. 12 can be done.

In this embodiment, FAT16 and FAT32 have been exemplified as the file systems. However, since various other file systems are available, they do not limit the present invention.

As described above, according to the first embodiment, information recording can be done by maximally utilizing the capacity of the storage medium, while maintaining compatibility to an electronic device which can handle only a storage medium initialized by the first file system to some extent.

Second Embodiment

Figure 13:
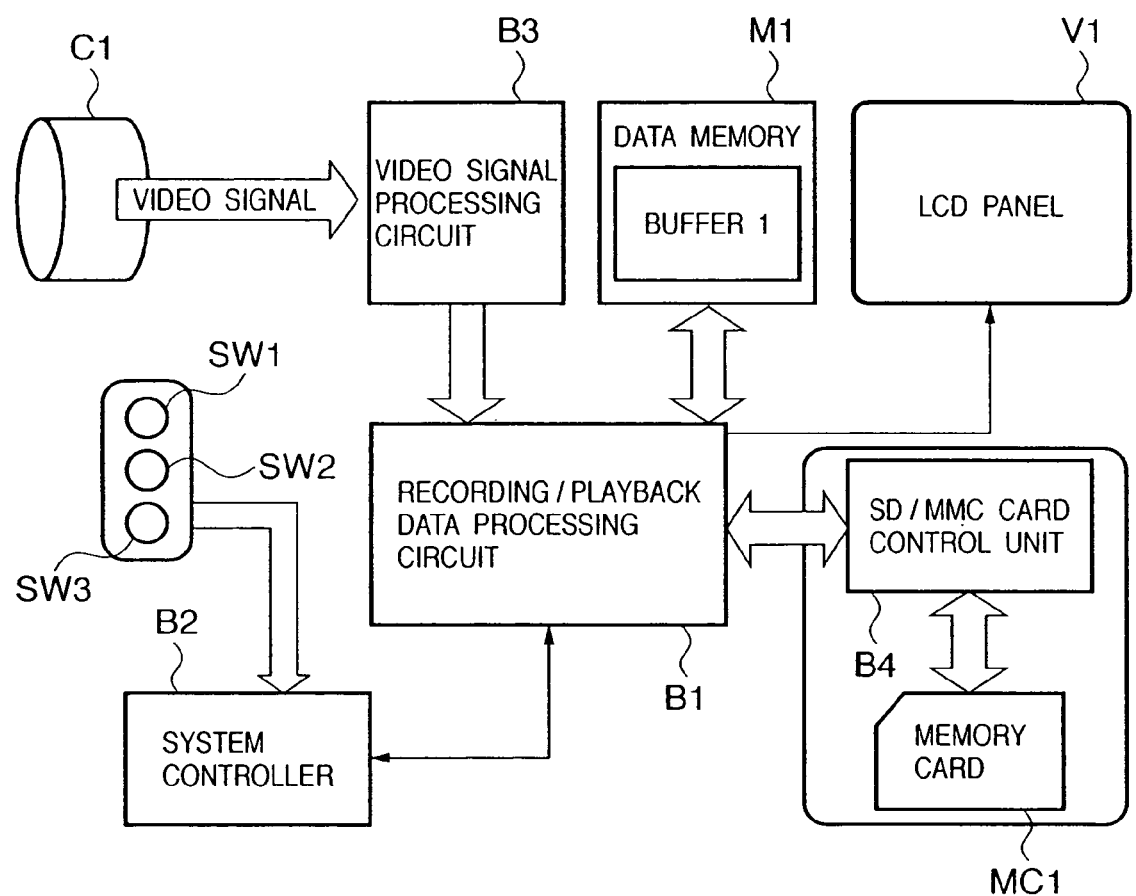
FIG. 13 is a block diagram showing the basic arrangement of an image recording/playback apparatus according to the second embodiment.

FIG. 13 is a block diagram for explaining an example of the arrangement of an image recording/playback apparatus that best illustrates characteristic features of a recording apparatus according to the second embodiment. Referring to FIG. 13, reference numeral MC1 denotes a rewritable, detachable memory card; C1, an image sensing unit for converting an object image into a video signal; B2, a system controller for controlling respective units; and B3, a video signal processing circuit for processing a video signal output from the image sensing unit C1.

Reference numeral B1 denotes a recording/playback data processing circuit for recording the video signal processed by the video signal processing circuit B3 on the memory card MC1 and processing image data played back from the memory card MC1; B4, an SD/MMC card control unit for controlling the memory card MC1; V1, a liquid crystal panel for displaying a sensed image or playback image; M1, a memory for buffering image data upon recording or playback; SW1, a still image sensing switch; SW2, a moving image sensing switch; and SW3, a continuous/single-shot select switch.

An overview of a system that makes format identification of the memory card MC1 including a plurality of formats will be explained below.

Figure 14:
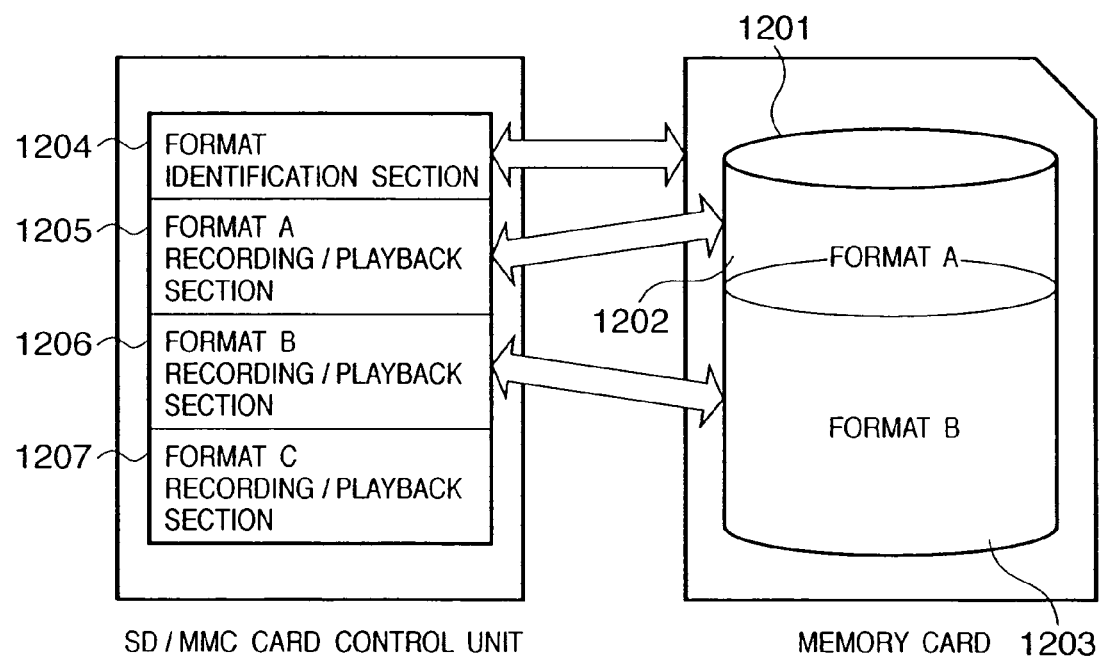
FIG. 14 shows an overview of an example of the configuration that identifies a plurality of formats.

FIG. 14 shows association between the memory card MC1 and SD/MMC card control unit B4 in the image recording/playback apparatus according to the second embodiment.

When the memory card MC1 includes two formats 1201 (first area 1202 and second area 1203), a format identification section 1204 in the SD/MMC card control unit B4 identifies the formats in the memory card MC1.

If the first area 1202 has a first format A, a first format A recording/playback section 1205 accesses that first area 1202 upon image recording/playback. When the second area 1203 has a second format B, a second format B recording/playback section 1206 accesses that second area 1203. That is, the recording/playback sections are provided for respective formats. Note that reference numeral 1207 in FIG. 14 denotes a third format C recording/playback section.

Figure 15:
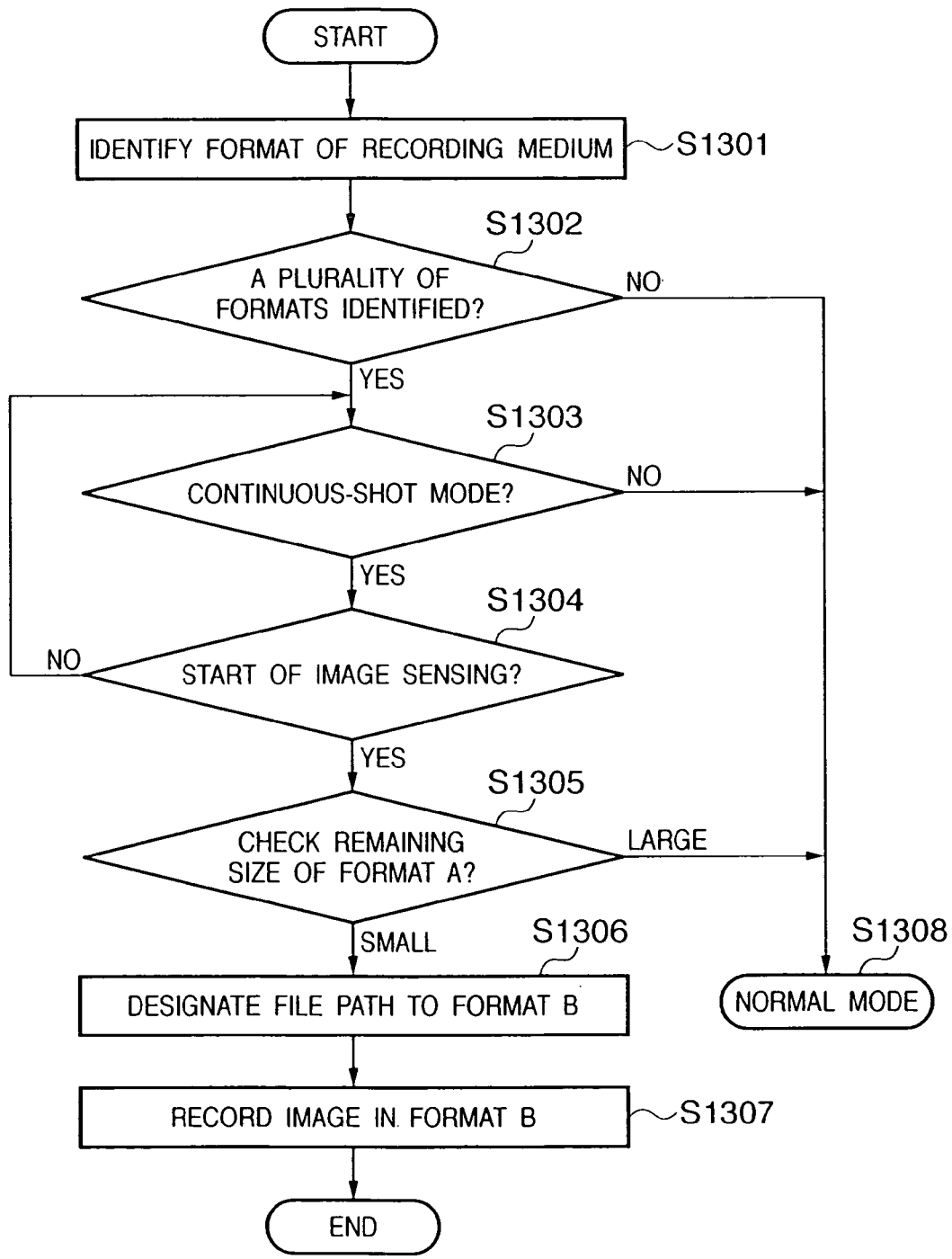
FIG. 15 is a flowchart showing an example of the operation processing of the image recording/playback apparatus according to the second embodiment.

The operation processing sequence of the image recording/playback apparatus of this embodiment will be described below with reference to the flowchart of FIG. 15.

When the image recording/playback apparatus of this embodiment recognizes attachment of the memory card MC1, the SD/MMC card control unit M4 identifies the formats in the memory card MC1 (step S1301).

This identification result is checked in step S1302. If a plurality of formats exist, the flow advances to step S1303. It is checked in step S1303 if a continuous-shot mode is selected by the continuous/single-shot select switch (SW3). If the continuous-shot mode is selected, the control enters the continuous-shot mode (step S1303).

The control waits until the still image sensing switch SW1 is operated in step S1304. If the still image sensing switch SW1 is operated to start continuous-shot image sensing, the flow advances to step S1305.

In step S1305, the SD/MMC card control unit B4 checks the remaining recording size of the first format A area (1202). As a result, if the remaining recording size is equal to or smaller than a predetermined remaining size (e.g., 1 MB or less), a file path required to record sensed images is designated in the second format B area (1203) (step S1306).

For example, a file name next to the file name of a previously sensed image is designated in the second format B area (1203). For example, if the previous file name is "C:¥102CANON¥IMG_0202.JPG", the currently sensed image file is recorded with a sequential file name like "D:¥102CANON¥IMG_0203.JPG" from the number next to the previously recorded file name of the image.

The flow advances to step S1307, and image recording to the second format B area (1203) is started.

If only one format exists in the memory card MC1 (step S1302) or a single-shot mode is selected (step S1303), and if the first format A area has a free space large enough to record images (step S1305), normal image recording is done by designating a file name next to the previously recorded file name (step S1308).

Figure 16:
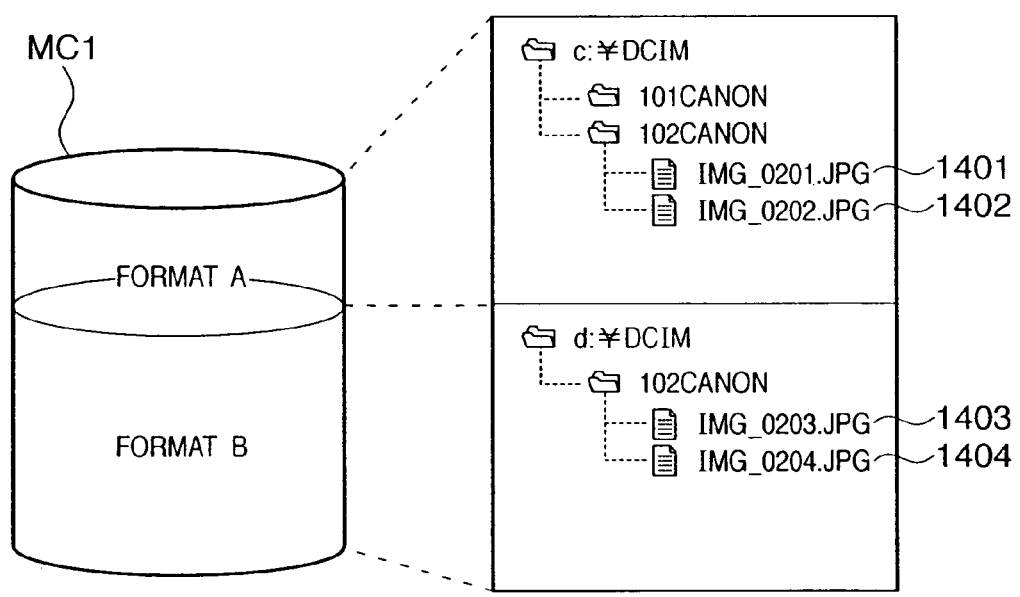
FIG. 16 shows an example of a naming method in a continuous shot recording mode according to the second embodiment.

FIG. 16 shows an example of the file path designation method in the above flowchart (step S1306).

In normal single-shot image sensing, a recording image file is named to have a serial number obtained by adding 1 to the previously recorded file number. For example, when the file name of the previously recorded image is "IMG_0201.JPG", the file name of the currently sensed image is "IMG_0202.JPG".

When these files exist to have a hierarchical structure shown in FIG. 16, the file paths upon image recording are designated as follows.

C:¥DCIM¥102CANON¥IMG_0201.JPG (1401)

C:¥DCIM¥102CANON¥IMG_0202.JPG (1402)

In this case, assume that the first area (1202) is a C drive, and the second area (1203) is a D drive.

Image recording in continuous-shot image sensing will be described below.

When a plurality of formats (first format A and second format B) exist in the memory card MC1 and the first format A area has a sufficiently large free space, if continuous-shot image sensing is done, file paths are designated as follows.

C:¥DCIM¥102CANON¥IMG_0203.JPG

C:¥DCIM¥102CANON¥IMG_0204.JPG

:

However, if the first format A has a predetermined remaining size or less (e.g., the remaining size is 1 MB or less), file paths starting from the number next to the previously recorded file name are designated in the same directory layer of the second format B area as the first format A area. At this time, assume that the second format B area is assured on the D drive.

D:¥DCIM¥102CANON¥IMG_0203.JPG (1403)

D:¥DCIM¥102CANON¥IMG_0204.JPG (1404)

In this embodiment, the remaining size check is done before image recording is performed on the recording medium upon continuous-shot image sensing. Also, when the remaining size check is also done immediately before image recording, and the remaining size becomes equal to or smaller than the predetermined remaining size after recording of a plurality of image, images can be sensed in the continuous-shot mode by designating their file paths to the second format B area.

This embodiment has exemplified a case wherein two different formats exist in the recording medium. Also, two identical formats or three different formats may exist.

Third Embodiment

The third embodiment of the present invention will be described below with reference to the accompanying drawings.

Figure 17:
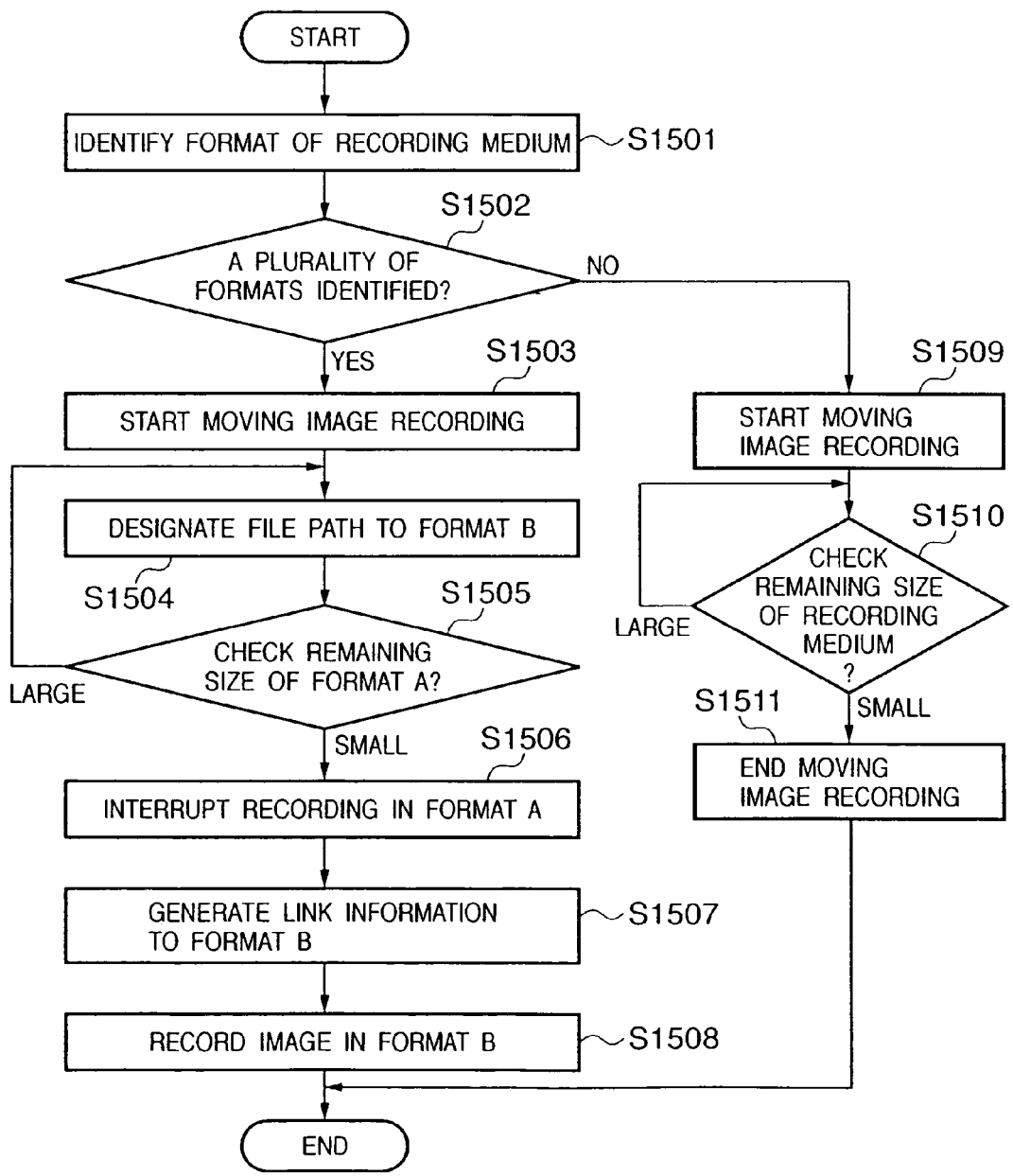
FIG. 17 is a flowchart showing an example of the operation processing of an image recording apparatus according to the third embodiment.

Since the arrangement of the image recording/playback apparatus of the third embodiment is the same as that of the image recording/playback apparatus of the second embodiment, a description thereof will be omitted. FIG. 17 is a flowchart showing the operation processing sequence of a moving image recording/playback apparatus of the third embodiment.

As shown in FIG. 17, when the image recording/playback apparatus recognizes attachment of the memory card MC1, the format identification in the memory card MC1 is done (step S1501), and it is identified if a plurality of formats exist in the memory card MC1 (step S1502). As a result of identification, if a plurality of formats exist, the flow advances to step S1503; otherwise, the flow advances to step S1509.

Figure 18:
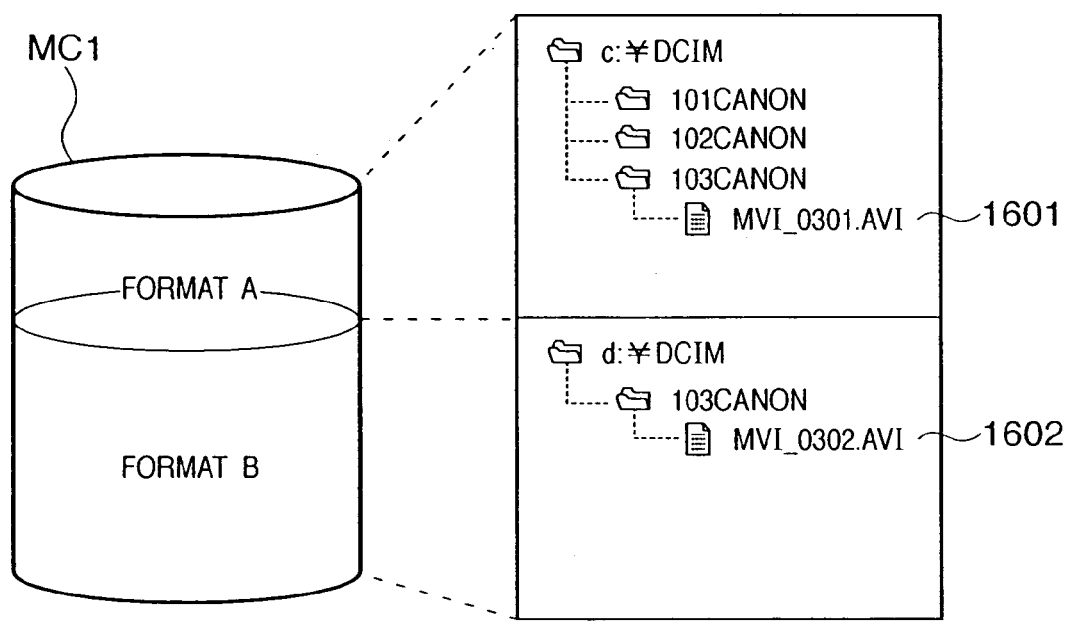
FIG. 18 shows an example of a naming method in a moving image recording mode.

In step S1503, moving image sensing starts upon depression of the moving image sensing switch (SW2). FIG. 18 shows an example of files recorded by the moving image recording. Upon starting the moving image sensing, a file "MVI_0301.AVI" is created, and data begins to be written in the memory card MC1.

At this time, the SD/MMC card control unit B4 designates the following file path on the memory card MC1 (step S1504).

C:¥103CANON¥MVI_0301.AVI (1601)

The remaining recording size of the first area 202 (first format A) is checked (step S1505). If the remaining recording size becomes equal to or smaller than a predetermined remaining size (e.g., 200 KB or less), the data write access to the first format A area is interrupted without ending the moving image sensing operation (step S1506) to close the file, and the moving image recording is continued by designating the following file path to the second area (1203: second format B) (step S1508).

D:¥103CANON¥MVI_0302.AVI (1602)

In this case, link information between the file recorded on the first format A area and that recorded on the second format B area is appended (step S1507).

If it is determined in step S1502 that only one format exists in the memory card MC1, moving image sensing starts upon depression of the moving image sensing switch (SW2) in step S1509, and the remaining size of the recording medium is checked (step S1510). If the remaining size is equal to or smaller than the predetermined remaining size (e.g., 200 KB or less), the moving image recording ends (step S1511). That is, a normal recording operation is performed.

FIG. 19 shows an example of a moving image related image list of related images which have a plurality of image formats.

In the aforementioned flow (steps S1501 to S1508), if the file (1601) recorded on the first format A area and the file (1602) recorded on the second format B area form one related moving image, the file paths are described in the moving image related image list in the order that they are recorded (1701). This moving image related image list is held in a link information holding means (not shown), and is used upon playback. In this way, it is determined that the two files separately stored in the C and D drives form related moving image data, and they can be continuously played back as a series of moving image data.

Note that image recording has been exemplified in the above embodiment. However, as indicated by an extension of AVI (audio visual interleaved file) in the moving image related image list in FIG. 19, since the interleaved format that alternately allocates audio and image data is adopted, audio data can be similarly recorded.

The scope of the present invention includes a case wherein the functions of the embodiments are implemented by supplying a program code of software that implements the functions of the embodiments to a computer (or a CPU or MPU) in a system or apparatus, which is connected to various devices to make these devices implement the functions of the aforementioned second and third embodiments, and making the computer of the system or apparatus control the devices in accordance with the stored program.

In this case, the program code itself of software implements the functions of the embodiments, and the program code itself, and means for supplying the program code to the computer (i.e., a recording medium which stores the program code) constitute the present invention. As the recording medium for storing such program code, for example, a flexible disk, hard disk, optical disk, magnetooptical disk, CD-ROM, magnetic tape, nonvolatile memory card MC1, ROM, and the like may be used.

The program code is included in the embodiments of the present invention not only when the functions of the above embodiments are implemented by executing the supplied program code by the computer, but also when the functions of the embodiments are implemented by collaboration of the program and an OS (operating system) or another application software running on the computer.

Furthermore, the present invention includes a case wherein the functions of the above embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the second and third embodiments, upon recording a plurality of related images sensed by, e.g., continuous-shot image sensing or the like on a single recording medium which includes a plurality of formats, when the remaining size of the image format that currently records an image whose image sensing is in progress is insufficient, the images can be recorded by automatically switching the image format that currently records an image whose image sensing is in progress to another image format. In this manner, the resources of the recording medium can be maximally utilized without making the user recognize the presence of a plurality of formats.

Fourth Embodiment

Figure 20:
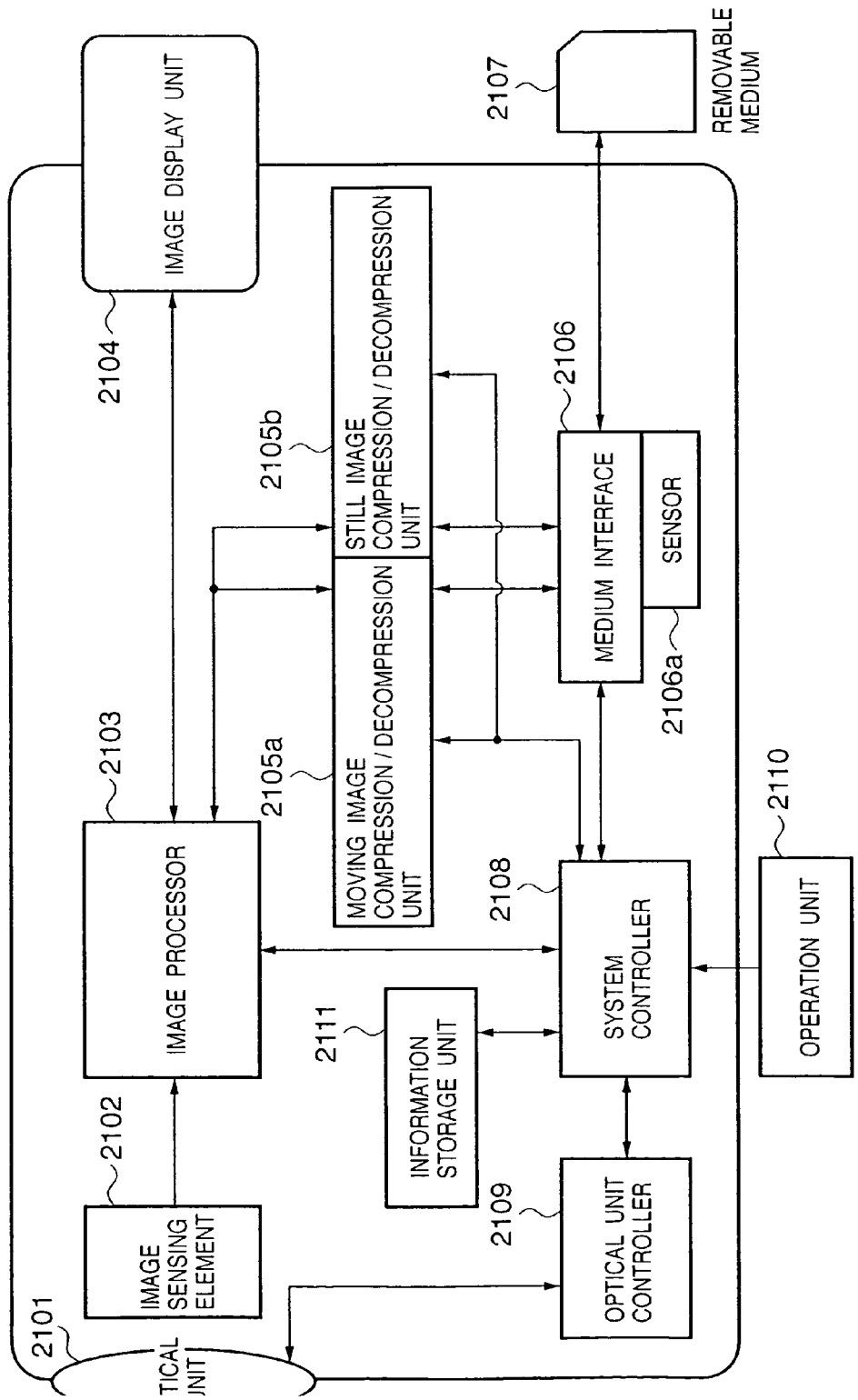
FIG. 20 is a block diagram showing an image sensing apparatus according to the fourth embodiment.

FIG. 20 is a block diagram of a digital video camera which senses and records a moving image/still image according the fourth embodiment. The arrangement of the digital video camera will be explained below together with its operation processing.

External light coming from an optical unit (including a lens, aperture, motors for driving them, and the like) 2101 forms an image on the surface of an image sensing element 2102, and that image is converted into an electrical signal. This signal is supplied to an image processor 2103, and is converted into digital image data. The image data is displayed on an image display unit (liquid crystal display unit) 2104, and can be confirmed as a sensed image.

Data to be written in a removable medium (rewritable storage medium) is compressed by a moving image compression/decompression unit 2105*a* if it is a moving image or by a still image compression/decompression unit 2105*b*, and is written in a removable medium 2107 via a medium interface 2106. On the contrary, when data in the removable medium 2107 is to be played back, the data is decompressed by the compression/decompression unit 2105*a* or 2105*b*, and is displayed on the image display unit 2104 via the image processor 2103. In some cases, a playback signal can be output to an external device (external display device) via an external output terminal. The medium interface 2106 includes a sensor 2106*a* that detects attachment/detachment of the removable medium 2107.

A system controller 2108 includes a microprocessor, a ROM that stores a program as the processing sequence of the microprocessor (corresponding to flowcharts to be described later), and a RAM used as a work area. The system controller 2108 controls the image processor 2103, the moving image compression/decompression unit 2105*a*, the still image compression/decompression unit 2105*b*, the medium interface 2106, and an optical unit controller 2109. The user operates the apparatus by operating various switches, buttons, dials, and the like provided to an operation unit 2110. The system controller 2108 can store information in an information storage unit 2111 as needed.

Figure 21:
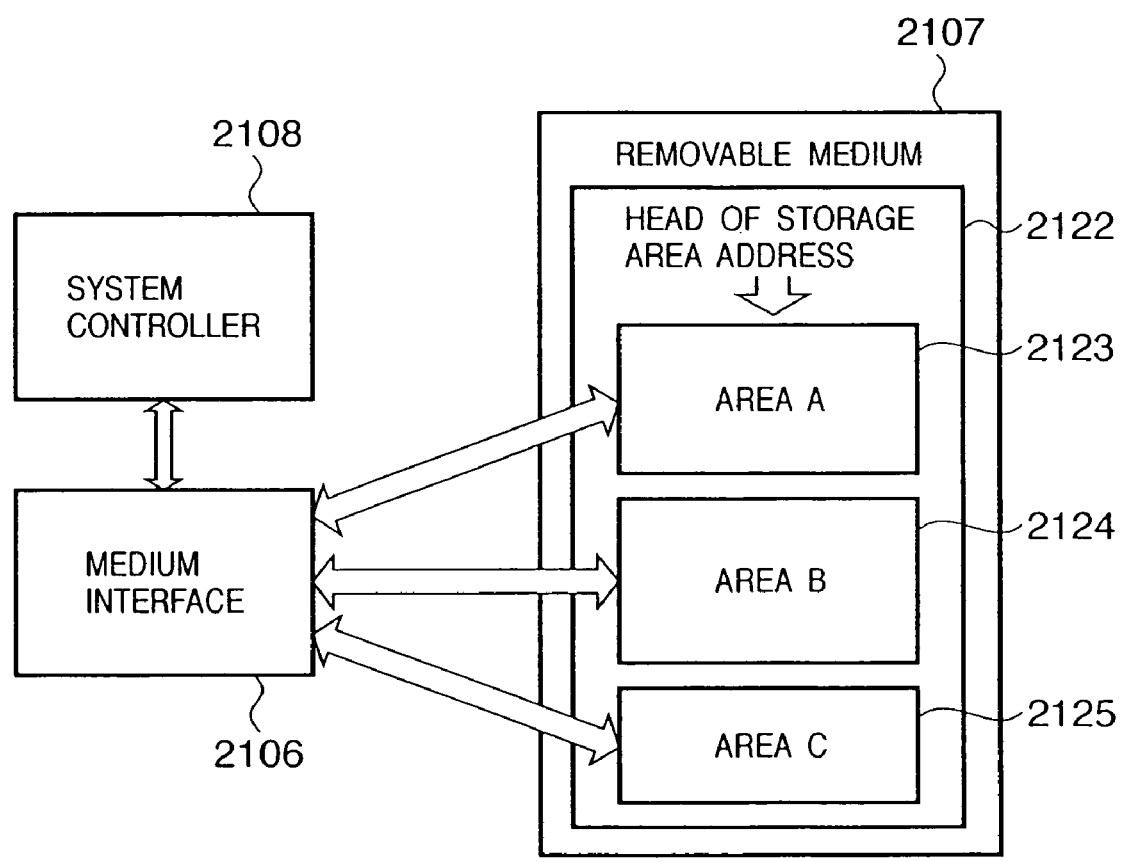
FIG. 21 illustrates access processes of a system controller to a removable medium in the image sensing apparatus according to the fourth embodiment.

FIG. 21 shows the relationship between the data structure of the removable medium and the system controller 2108 in the fourth embodiment. In the following description of the fourth embodiment, assume that the single removable medium 2107 has three partition areas (A, B, and C) 123 to 125, which are formatted. Each partition area is formatted by, e.g., FAT16 as a standard file system in a digital camera.

After the removable medium 2107 is attached to the apparatus, if the power switch of the apparatus is turned on, the system controller 2108 recognizes the file system present in the medium, and detects the cluster sizes of the areas A to C. This detection information is stored in the information storage unit 2111, and is held until the removable medium is detached or the power switch of the apparatus is turned off.

In case of the FAT16 file system, the cluster size for 1 GB over to 2 GB is 32 KB, that for 512 MB over to 1 GB is 16 KB, and that for 256 MB over to 512 MB is 8 KB.

In the following description or the sake of simplicity, assume that the cluster sizes of the respective partition areas satisfy:

A>B>C

In case of a still image, a result of JPEG-encoding each individual image is stored as a file. In general, since JPEG encoding adopts variable-length encoding, the size of each JPEG file is not fixed. If arbitrary still image data (JPEG image data) has a size of 500 KB, and is stored in a partition having a cluster size of 32 KB, we have:

500/32=15 remainder 20

Hence, 16 clusters are consumed, and 12 KB (=32−20) in 32 KB of the last cluster are consumed as a wasteful area.

Under the same conditions, if the cluster size is 8 KB, we have:

500/8=62 remainder 4

Hence, 63 clusters are consumed, and 4 KB in 8 KB of the last cluster are consumed as a wasteful area. That is, the memory size which is consumed wastefully varies depending on the cluster size.

In case of a still image, the size is not always fixed. A data size which is consumed wastefully per file is half the cluster size on average. That is, let N be the number of files, and C be the cluster size. Then, the memory size which is consumed wastefully is approximately given by:

N×C/2

That is, the memory size which is consumed wastefully is proportional to the cluster size and the number of files.

In case of a still image, each individual file size is smaller than that of a moving image, but the number of files is apt to be large. Also, a still image does not require high-speed write/read access to the removable medium compared to a moving image.

As can be seen from the above examination, when a partition area with a smaller cluster size is selected as the storage destination of still images, memory savings can be attained, resulting in convenience.

On the other hand, in case of a moving image file, its file size is far bigger than a still image although it depends on an image sensing duration. In general, the number of files is apt to be smaller than still images. In other words, since the ratio of an area which is consumed wastefully per moving image file is small, no serious problem is posed even when the cluster size is large, and a larger cluster size is preferably used in terms of the access speed (the number of times of accesses decreases with increasing cluster size).

The description will revert to the processing operation. The cluster sizes of the partition areas A, B, and C of the removable medium 2107 in this embodiment satisfy A>B>C, and this relation information is stored in the information storage unit 2111.

Therefore, upon writing a moving image, the system controller 2108 selects the area A with the largest cluster size (hence, highest access speed) of the removable medium 2107 as a write destination on the basis of the information in the information storage unit 2111, and records data via the medium interface 2106. When the remaining recordable size of the area A becomes insufficient, the system controller 2108 selects the area with the highest access speed (partition area B in this embodiment) except for the area A at the beginning of the next moving image recording.

On the other hand, upon writing a still image, the system controller 2108 selects the partition area C with the smallest cluster size of the removable medium 2107 as a write destination on the basis of the information in the information storage unit 2111, and records data via the medium interface 2106. When the remaining recordable size of the area C becomes insufficient, the system controller 2108 selects the partition area B with the next smallest cluster size except for the area C at the beginning of the next still image recording.

An overview of this embodiment has been explained, and details of the processing of the system controller 2108 will be described below.

The processing in an early stage after the power switch of the apparatus of this embodiment is turned on, and when the sensor 2106*a* detects that the removable medium is inserted/removed in a power ON state will be described below with reference to the flowchart of FIG. 22.

In step S2001, partition analysis of the attached removable medium is made. In step S2002, the cluster sizes of the respective partitions are detected. Each cluster size can be detected from the total size of the partition.

The flow advances to step S2003, and information which specifies the partitions (partition names or start addresses of the respective partition areas in the removable medium) in descending order of cluster size is stored in the information storage unit 2111. The flow then advances to step S2004. In step S2004, "auto recording mode" is selected as a default recording mode of each of a still image and moving image, and is stored in the information storage unit 2111.

When the removable medium is inserted/removed, the contents of the information storage unit 2111 are automatically rewritten. At this time, a message indicating that the auto recording mode is selected as the recording mode is preferably displayed. As is apparent from the following description, the reason for this is that the user must set the order of partitions used in storage.

FIG. 23 shows the state of the information storage unit 2111 immediately after the aforementioned process. As shown in FIG. 23, an auto recording mode flag is set in the first record, and stores still and moving image recording modes (2 bits suffice for this flag).

Figure 22:
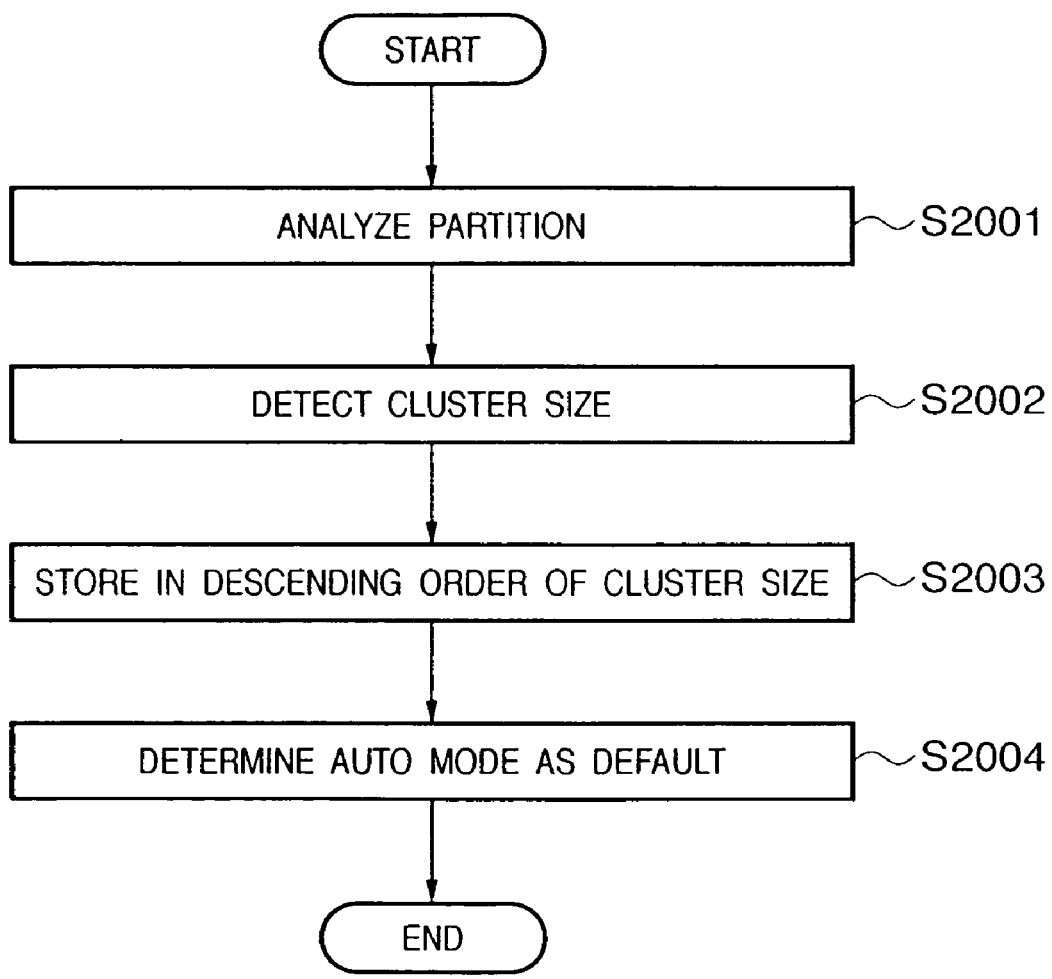
FIG. 22 is a flowchart showing the processing contents upon power ON of the apparatus or upon attaching the removable medium.

Immediately after the process in FIG. 22, the auto recording mode is selected as each of the still and moving image recording modes. The next second record is an area indicating the number of partitions of the removable medium, and subsequent records store the order of partitions for storing a moving image, and the order of partitions for storing a still image. "-" in the last record indicates a predetermined code indicating no significant data in subsequent records. As shown in FIG. 23, the order of partitions for storing a moving image is opposite to that of partitions for storing a still image.

Normally, the information storage unit 2111 can have the aforementioned contents. However, the contents of the information storage unit 2111 can be changed to meet a requirement of some users who want to set partition areas that respectively store moving and still images.

Figure 24A:
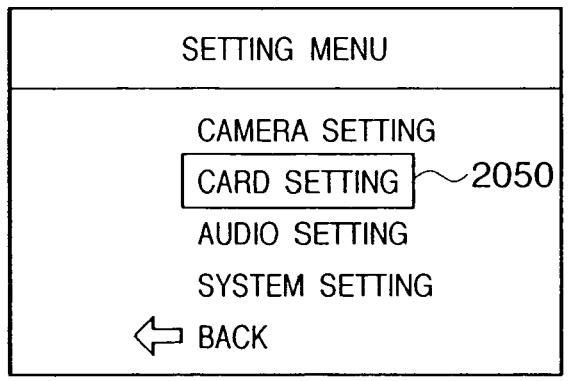
FIGS. 24A to 24C show transition until a GUI used to set the partition storage order is reached in the fourth embodiment.

FIG. 24A shows a menu to be displayed on the image display unit 2104 when a menu display instruction key is pressed on the operation unit 2110. As shown in FIG. 24A, major items such as camera setting, card setting, audio setting, system setting, and the like are displayed as setting items. When the user moves a cursor 2050 to a required item by operating cross-cursor keys provided to the operation unit 2110, and then presses an "enter" key, a further detailed setting menu of that item can be displayed. In "camera setting", a compression ratio, image sensing resolution, and the like can be set. A case will be described below wherein "card setting", i.e., a setting for the attached removable medium is selected. At this time, the image display unit 2104 displays a submenu shown in FIG. 24B. This submenu displays partition & format, and moving and still image recording modes as select items, and also the current modes (auto or manual) of the moving and still image recording modes. When "partition & format" is selected, deletion of a partition of the attached removable medium, creation of a new partition (area size), and formatting required to create the FAT16 file system on that partition can be made.

A case will be explained below wherein "moving image recording mode" is selected. If this item is selected, a window shown in FIG. 24C is displayed, and the order upon recording a moving image can be set. For example, in the state shown in FIG. 24C, since the cursor is located on "partition A", the user operates a change key in this state and then operates an up or down key, thus changing the order of this partition with neighboring partitions. When "auto" is selected, the set order is ignored, and the partitions are sorted in descending order of cluster size.

After the moving image recording order is determined in this way, if the determined order is different from that in the auto mode as a default mode, the flag of the moving image recording mode in the first record of the information storage unit 2111 is set to be OFF, and the contents of the records that store the set order of partitions are changed.

Figure 24B:
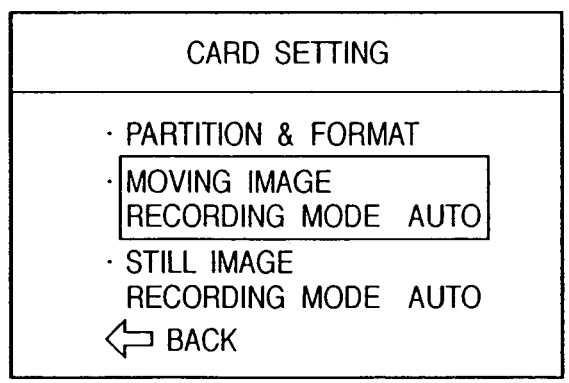
Figure 24C:
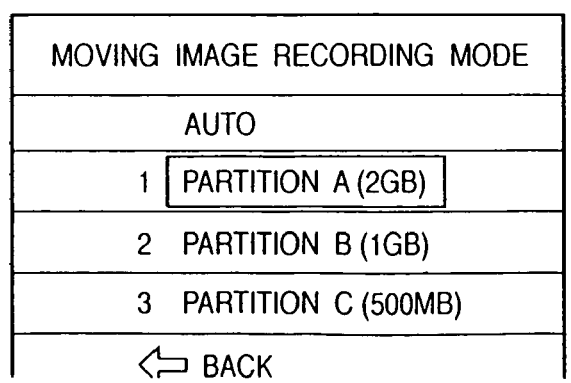

Note that the process to be executed when "still image recording mode" is selected in FIG. 24B, is substantially the same as that in "moving image recording mode", as can be easily understood from the above description. Hence, a description thereof will be omitted.

Figure 25:
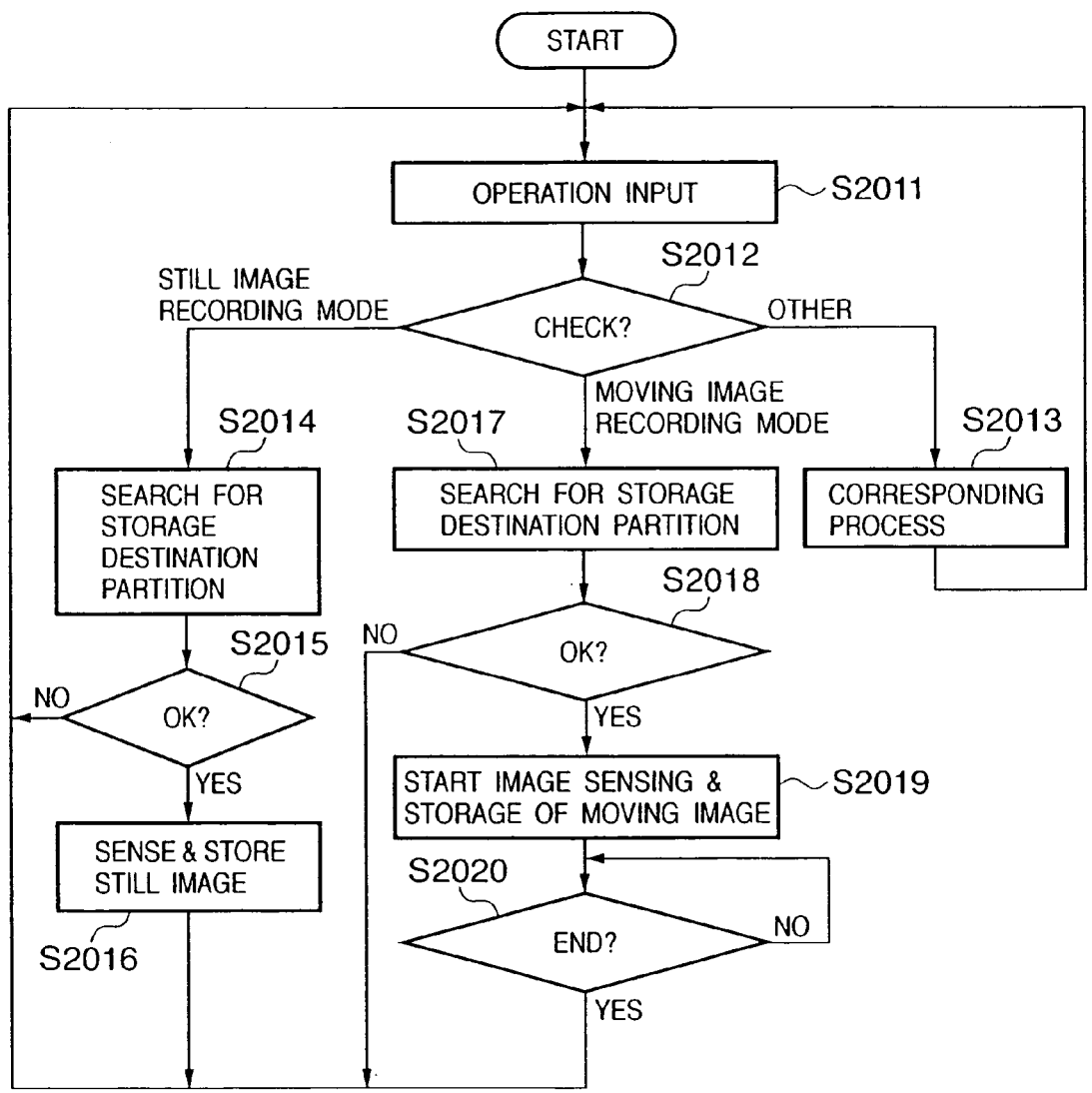
FIG. 25 is a flowchart showing the overall processing of the image sensing apparatus according to the fourth embodiment.

The overall process in the image sensing apparatus of this embodiment will be described below with reference to the flowchart of FIG. 25.

In step S2011, the control waits for an input from the operation unit 2110. If some input is made, the flow advances to step S2012 to check if the input indicates a still image sensing mode, moving image sensing mode, or other requests. In case of an instruction input other than the image sensing mode, the flow advances to step S2013 to execute a corresponding process (e.g., various setting processes using the menu shown in FIG. 24A).

If it is determined in step S2012 that the still image sensing mode is selected, a search process of a storage destination partition of a sensed still image is executed in step S2014. It is checked in step S2015 if the search process of the storage destination partition has succeeded (if no free storage area is available, the search process of the storage destination partition has failed). If the search process of the storage destination partition has succeeded, the flow advances to step S2016. In step S2016, a still image is sensed and the sensed image is encoded upon depression of a shutter button or the like provided to the operation unit 2110, and the encoded image data is stored as a still image file in the partition area of the removable medium found in step S2014. Upon image sensing, an AF process, AE process, and the like are executed. However, since such processes are not directly related to the present invention, a description thereof will be omitted.

On the other hand, if the moving image sensing mode is selected, the flow advances to step S2017 to execute a search process of a storage destination partition of a moving image. It is checked in step S2018 if the search process of the storage destination partition has succeeded. If the search process of the storage destination partition has succeeded, the flow advances to step S2019. In step S2019, the image sensing process and encoding process of a moving image, and storage of the moving image as a file in the determined partition area of the removable medium are started upon depression of a recording start instruction button provided to the operation unit 2110. The image sensing process of the moving image is continued until it is determined in step S2020 that a recording end instruction is input. It is also determined that the process is to end when the corresponding partition area becomes full of data during storage of the moving image.

The storage destination search process of the storage destination partition of still image data in step S2014 will be described below with reference to the flowchart of FIG. 26.

In step S2021, the order information of the partition areas required to record a still image is loaded from the information storage unit 2111. Note that the partitions are sorted in ascending order of cluster size unless the partition order is changed on the display window (user interface) in FIG. 24C upon power ON or after the removable medium is attached.

In step S2022, "1" is set as an initial value in a variable i to select the first partition in the partition order as a still image storage destination stored in the information storage unit 2111.

It is checked in step S2023 if the i-th partition area of interest has a free space. If the i-th partition area of interest has no free space, the flow advances to step S2024 to check if all the partitions have been checked (since there are three partitions in the example of this embodiment, it is checked if the variable i is "3"). If NO in step S2024, the variable i is incremented by "1" in step S2025, and the flow returns to step S2023. If all the partitions have no free spaces, an error process (e.g., a display of a message indicating that image sensing cannot be done) is executed, and a search failure message is sent to the call source of this process, thus ending this process.

If it is determined that the i-th partition area has a free space, the flow advances from step S2023 to step S2027 to return the i-th partition area as a search result to the call source, thus ending this process.

Figure 27:
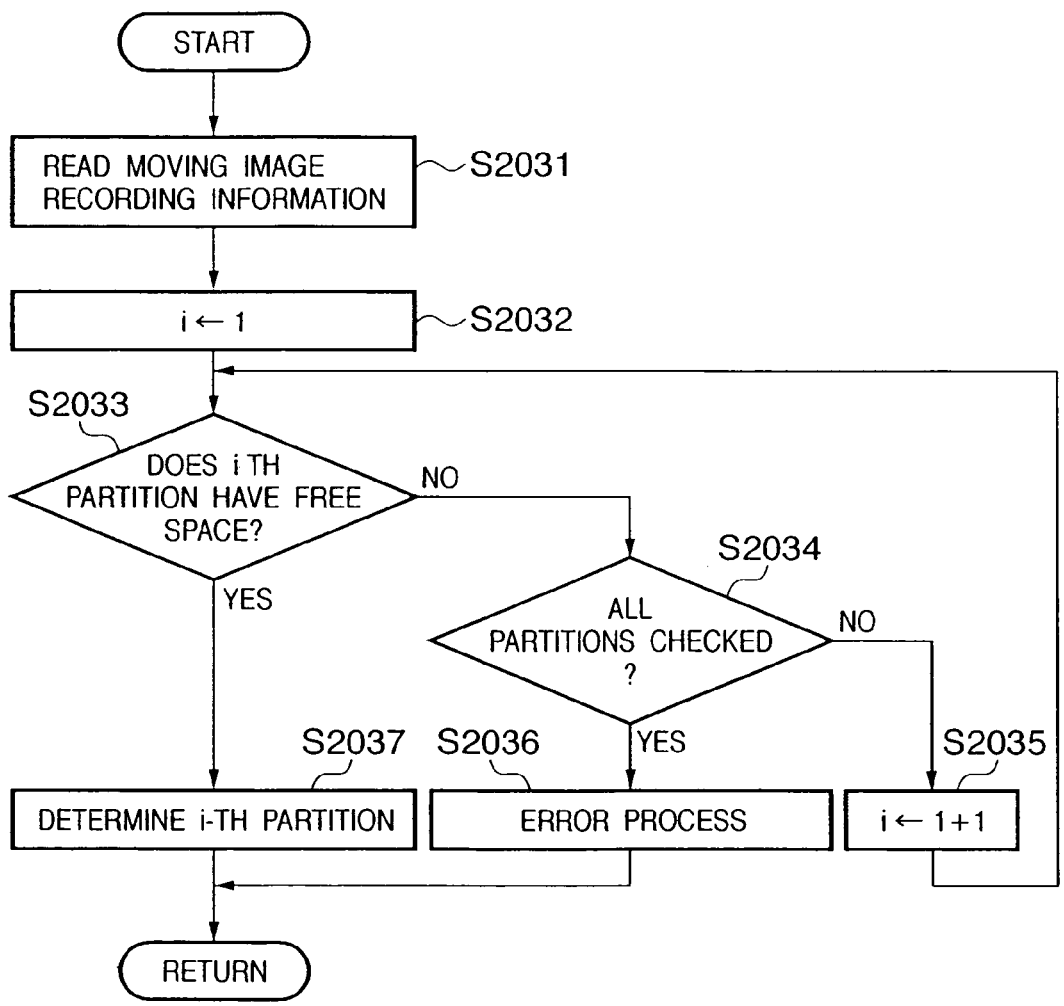
FIG. 27 is a flowchart showing details of step S17 in FIG. 25.

The storage destination search process of the storage destination partition of moving image data in step S2017 in FIG. 25 will be described below with reference to the flowchart of FIG. 27.

Figure 26:
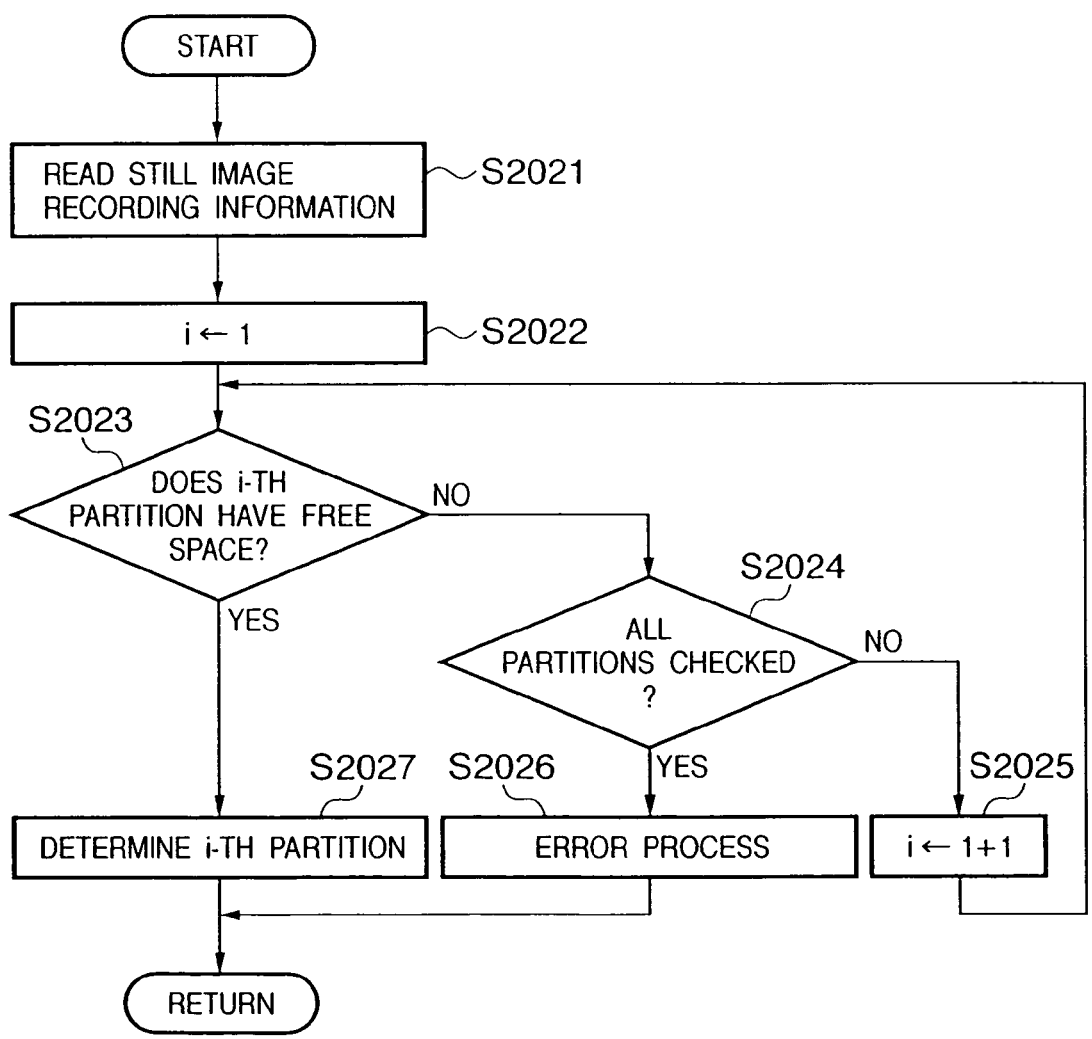
FIG. 26 is a flowchart showing details of step S14 in FIG. 25.

This process is substantially the same as in FIG. 26. In step S2031, the order information of the partition areas required to record a moving image is loaded from the information storage unit 2111. Note that the partitions are sorted in descending order of cluster size unless the partition order is changed upon power ON or after the removable medium is attached.

In step S2032, "1" is set as an initial value in a variable i to select the first partition in the partition order as a moving image storage destination stored in the information storage unit 2111.

It is checked in step S2033 if the i-th partition area of interest has a free space. If the i-th partition area of interest has no free space, the flow advances to step S2034 to check if all the partitions have been checked (since there are three partitions in the example of this embodiment, it is checked if the variable i is "3"). If NO in step S2034, the variable i is incremented by "1" in step S2035, and the flow returns to step S2033. If all the partitions have no free spaces, an error process (e.g., a display of a message indicating that image sensing cannot be done) is executed, and a search failure message is sent to the call source of this process, thus ending this process.

If it is determined that the i-th partition area has a free space, the flow advances from step S2033 to step S2037 to return the i-th partition area as a search result to the call source, thus ending this process.

As described above, according to the fourth embodiment, the number of moving image files obtained by image sensing is apt to be small, and each moving image file has a large size and requires high access speed. Hence, in consideration of these points, the moving image file is stored in the partition area with a large cluster size, thus posing no problem in terms of the memory use efficiency, and hardly occupying the still image storage area.

On the other hand, in case of a still image, each individual file size is much smaller than the moving image file size, but the number of files to be recorded is apt to be large. Hence, in consideration of these points, still image files are preferentially stored in the partition with a small cluster size, thus improving the memory use efficiency of the storage medium.

In the fourth embodiment, the storage medium is not particularly specified, and the present invention is not limited to any specific types of storage media as long as they are detachable storage media that allow random access. For example, a semiconductor memory card or a spindle-system storage medium may be used.

In the above embodiment, FAT16 has been exemplified as the file system of the partitions assured on the storage medium. However, the present invention is not limited to such specific file system, and other file systems may be used or different file systems may be used together. In brief, a file system with a small cluster size may be preferentially used in case of a still image, and a file system with a property opposite to it may be preferentially used in case of a moving image.

When the memory area of one storage medium is divided into a plurality of partition areas, a storage medium having a capacity exceeding the maximum size that can be accessed by a given file system can be used as a side effect. For example, FAT16 has an upper limit up to 2 GB. Hence, in case of a storage medium having a memory size over 2 GB, if one partition is set by FAT16, the remaining memory space becomes an unused area. By setting a plurality of partition areas, a large-capacity storage medium can be used.

As described above, according to the fourth embodiment, a storage medium as a storage target is allowed to have a plurality of partition areas, and an optimal storage destination partition area is determined depending on whether an image to be recorded is a still or moving image, thus effectively utilizing the memory area of the storage medium.

Note that the techniques disclosed in the first to fourth embodiments may be combined.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priorities from Japanese Patent Application Nos. 2004-148036 filed on May 18, 2004, 2004-174596 filed on Jun. 11, 2004, and 2004-174597 filed on Jun. 11, 2004, which are hereby incorporated by reference herein.

What is claimed is:

1. An information recording apparatus for recording information in a detachable, rewritable storage medium which has a storage size exceeding a maximum allowable size of a first file system, comprising:

first information recording means for, when externally input information is stored in a single storage medium having a first storage area initialized by the first file system, and a second storage area initialized by a second file system which can access an area that exceeds the maximum allowable size of the first file system, storing the externally input information in the second area, and information derived from the externally input information in the first area;

management information recording means for recording link information between the information stored in the second area and the derivative information stored in the first area, in the second area as management information;

determination means for determining whether or not the derivative information corresponding to the information stored in the second storage area of the storage medium exists in the first storage area;

selection means for, when said determination means determines that the derivative information corresponding to the information stored in the second storage area does not exist in the first storage area, selecting whether to restore the derivative information in the first storage area or to delete the information stored in the second storage area; and consistency means for, when said selection means selects that the derivative information is to be restored in the first storage area, generating derivative information from the corresponding information stored in the second storage area, and saving the derivative information in the first storage area, and for, when said selection means selects that the information stored in the second storage area is to be deleted, deleting the information in the second storage area, and updating the management information so as to maintain consistency of information in the first and second storage areas.

2. The apparatus according to claim 1, wherein the first file system is FAT16, and the second file system is FAT32.

3. The apparatus according to claim 1, further comprising image sensing means for generating image data as the externally input information, wherein the image data is stored in the area of the second file system, and a thumbnail image corresponding to the image data is stored in the area of the first file system.

4. The apparatus according to claim 1, further comprising:

play list generation means for generating a play list for information stored in the first storage area;

play list storage means for storing the generated play list in the first storage area; and playback output means for, when information is to be played back in accordance with the play list stored in said play list storage means, replacing information described in the play list by information stored in the second storage area in accordance with the management information and playing back and outputting the replaced information.

5. The apparatus according to claim 1, further comprising:

connection means for connecting a printer;

print setting file generation means for generating a print setting file for an image stored in the first storage area;

print setting file storage means for storing the generated print setting file in the first storage area; and print output means for, when an image is to be printed in accordance with the print setting file stored in said print setting file, replacing the image described in the print setting file by an image stored in the second storage area in accordance with the management information, and outputting the replaced image toward the printer connected by said connection means.

6. A method of controlling an information recording apparatus for recording information in a detachable, rewritable storage medium which has a storage size exceeding a maximum allowable size of a first file system, comprising:

a first information recording step of storing, when externally input information is stored in a single storage medium having a first storage area initialized by the first file system, and a second storage area initialized by a second file system which can access an area that exceeds the maximum allowable size of the first file system, the externally input information in the second area, and information derived from the externally input information in the first area;

a management information recording step of recording link information between the information stored in the second area and the derivative information stored in the first area, in the second area as management information;

a determining step of determining whether or not the derivative information corresponding to the information stored in the second storage area of the storage medium exists in the first storage area;

a selecting step of, when it is determined in the determining step that the derivative information corresponding to the information stored in the second storage area does not exist in the first storage area, selecting whether to restore the derivative information in the first storage area or to delete the information stored in the second storage area; and a consistency step of, when it is selected in the selecting step that the derivative information is to be restored in the first storage area, generating derivative information from the corresponding information stored in the second storage area, and saving the derivative information in the first storage area, and of, when it is selected in the selecting step that the information stored in the second storage area is to be deleted, deleting the information in the second storage area, and updating the management information so as to maintain consistency of information in the first and second storage areas.

* * * * *